United States Patent
Chen et al.

(10) Patent No.: US 12,259,488 B2
(45) Date of Patent: Mar. 25, 2025

(54) METHOD FOR DETERMINING POSITIONING INFORMATION AND COMMUNICATION APPARATUS

(71) Applicant: Huawei Technologies Co., Ltd., Shenzhen (CN)

(72) Inventors: Lei Chen, Chengdu (CN); Yangyang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 17/804,463

(22) Filed: May 27, 2022

(65) Prior Publication Data

US 2022/0291324 A1   Sep. 15, 2022

Related U.S. Application Data

(63) Continuation of application No. PCT/CN2019/122288, filed on Nov. 30, 2019.

(51) Int. Cl.
*G01S 5/02* (2010.01)
*H04W 28/02* (2009.01)

(52) U.S. Cl.
CPC ....... *G01S 5/0284* (2013.01); *H04W 28/0215* (2013.01)

(58) Field of Classification Search
None
See application file for complete search history.

(56) References Cited

U.S. PATENT DOCUMENTS

| 10,375,669 | B2 | 8/2019 | Edge |
| 10,841,895 | B2* | 11/2020 | Inoko ................ G01S 5/0063 |
| 2012/0127976 | A1 | 5/2012 | Lin et al. |
| 2018/0035256 | A1 | 2/2018 | Prevatt |
| 2019/0037350 | A1* | 1/2019 | Prevatt ................ G01S 5/0263 |
| 2022/0123847 | A1* | 4/2022 | Ghozlan ............ H04B 17/318 |
| 2022/0365163 | A1* | 11/2022 | Baek .................. H04W 4/40 |
| 2022/0386093 | A1* | 12/2022 | Baek .................. H04W 56/00 |

(Continued)

FOREIGN PATENT DOCUMENTS

| CN | 108702726 A | 10/2018 |
| CN | 109597027 A | 4/2019 |

(Continued)

OTHER PUBLICATIONS

3GPP TS 38.214 V15.7.0 (Sep. 2019), 3rd Generation Partnership Project; Technical Specification Group Radio Access Network; NR; Physical layer procedures for data (Release 15), 106 pages.

(Continued)

*Primary Examiner* — Adolf Dsouza
(74) *Attorney, Agent, or Firm* — Slater Matsil, LLP

(57) ABSTRACT

A terminal device sends at least one piece of relative position information to a network side device, where the relative position information is information about a relative position between any two of a plurality of tags supported by the terminal device. The terminal device measures, by using the plurality of tags, a reference signal sent by the network side device, to obtain reference signal measurement information corresponding to the plurality of tags. The terminal device sends, to the network side device, the reference signal measurement information corresponding to the plurality of tags.

18 Claims, 11 Drawing Sheets

(56) References Cited

U.S. PATENT DOCUMENTS

2024/0069148 A1\* 2/2024 Baek ................ H04W 4/023
2024/0113828 A1\* 4/2024 Manolakos .......... H04W 72/04

FOREIGN PATENT DOCUMENTS

WO     2018221515 A1    12/2018
WO     2019134555 A1     7/2019

OTHER PUBLICATIONS

LG Electronics, "Discussion on necessity and details for physical-layer procedures to support UE/gNB measurements", 3GPP TSG RAN WG1 #96bis, R1-1904202, Apr. 8-12, 2019, 9 Pages, Xi'an, China.

\* cited by examiner

METHOD FOR DETERMINING POSITIONING INFORMATION AND COMMUNICATION APPARATUS

CROSS-REFERENCE TO RELATED APPLICATIONS

This application is a continuation of International Application No. PCT/CN2019/122288, filed on Nov. 30, 2019, the disclosure of which is hereby incorporated by reference in its entirety.

TECHNICAL FIELD

This application relates to the field of communication technologies, and in particular, to a method for determining positioning information and a communication apparatus.

BACKGROUND

In an existing method for determining positioning information, a to-be-positioned terminal device is considered as a particle to determine positioning information (for example, location information, orientation information, and posture information of the terminal device) of the to-be-positioned terminal device. A downlink positioning process is used as an example. As shown in FIG. 1, a plurality of base stations send downlink reference signals to a terminal device, and the terminal device may obtain a plurality of downlink angles of departure by measuring the reference signals sent by the plurality of base stations. The terminal device reports, to a positioning device via the base stations, the plurality of downlink angles of departure obtained through measurement, and the positioning device may determine a location of the terminal device based on the plurality of reported downlink angles of departure. The downlink angle of departure is an included angle between a direction (for example, a direction of a horizontal plane or a normal direction of the horizontal plane) and a direction in which a reference signal sent by a base station leaves the base station. The positioning device may determine a straight line from the base station to the terminal device based on the downlink angle of departure, and the straight line is a direction line. As shown in FIG. 1, an intersection point of a direction line 1 to a direction line 3 is the location of the terminal device.

Currently, the location information that is of the terminal device and that is determined according to the existing method for determining positioning information cannot meet a high-precision positioning requirement of a 5G communication system. Therefore, how to improve precision of the determined positioning information is an urgent problem to be resolved in 5G and a next-generation mobile communication system of 5G.

SUMMARY

This application provides a method for determining positioning information and a communication apparatus, to help improve precision of determined positioning information.

According to a first aspect, this application provides a method for determining positioning information. The method includes: A terminal device sends at least one piece of relative position information to a network side device, where the relative position information is information about a relative position between any two of a plurality of tags supported by the terminal device. The terminal device measures, by using the plurality of tags, a reference signal sent by the network side device, to obtain reference signal measurement information corresponding to the plurality of tags. The terminal device sends, to the network side device, the reference signal measurement information corresponding to the plurality of tags.

According to the method described in the first aspect, the terminal device may send, to the network side device, the at least one piece of relative position information and the reference signal measurement information corresponding to the plurality of tags, so that the network side device may determine positioning information of the terminal device based on the at least one piece of relative position information and the reference signal measurement information corresponding to the plurality of tags. In this way, precision of the determined positioning information of the terminal device can be improved, so that positioning precision of the terminal device is improved. In addition, according to the method described in the first aspect, the positioning information of the terminal device may be determined based on a downlink reference signal sent by an access network device. This helps reduce a requirement on an environment deployment condition for positioning, orientation determining, or posture determining of the terminal device.

In a possible implementation, before the terminal device sends the at least one piece of relative position information to the network side device, the terminal device may further send first information to the network side device, where the first information includes positioning capability information of the terminal device, and the positioning capability information is used to indicate whether the terminal device has a capability of determining the positioning information by using the plurality of tags. When the terminal device has the capability of determining the positioning information by using the plurality of tags, the terminal device receives indication information sent by the network side device, where the indication information is used to indicate the terminal device to report the at least one piece of relative position information and/or the reference signal measurement information. Based on this possible implementation, the network side device can determine whether the terminal device has the capability of determining the positioning information by using the plurality of tags, to help the network side device select a method for determining the positioning information of the terminal device.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device. Based on this possible implementation, the network side device can determine a capability of positioning, orientation determining, or posture determining performed by the terminal device by using the plurality of tags.

In a possible implementation, the plurality of tags supported by the terminal device include one or more reference tags, the relative position information is information about a relative position between a non-reference tag and the reference tag, and the non-reference tag is a tag in the plurality of tags other than the reference tag. Based on this possible implementation, the network side device can accurately determine the positioning information of the terminal device.

In a possible implementation, the reference signal measurement information includes one or more of reference signal received power RSRP information, a time of arrival TOA, an angle of departure AOD, an angle of arrival AOA, a tag time difference of arrival TTDOA, a tag angle difference of departure TADOD, and a tag angle difference of arrival TADOA, where the tag time difference of arrival TTDOA is a difference between times of arrival TOAs of any two of the plurality of tags, the tag angle difference of departure TADOD is a difference between angles of departure AODs of any two of the plurality of tags, and the tag angle difference of arrival TADOA is a difference between angles of arrival AOAs of any two of the plurality of tags. Based on this possible implementation, the network side device can accurately determine the positioning information of the terminal device.

Optionally, the tag time difference of arrival TTDOA is specifically a difference between times of arrival TOAs of the non-reference tag and the reference tag in the plurality of tags, the tag angle difference of departure TADOD is specifically a difference between angles of departure AODs of the non-reference tag and the reference tag in the plurality of tags, and the tag angle difference of arrival TADOA is specifically a difference between angles of arrival AOAs of the non-reference tag and the reference tag in the plurality of tags.

In a possible implementation, if the reference signal measurement information includes the reference signal received power RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions. Based on this possible implementation, the network side device can accurately determine the angle of departure AOD or the angle of arrival AOA.

In a possible implementation, the reference signal measurement information further includes third information, and the third information includes one or more of the following information: a variance or a standard deviation of times of arrival TOAs, a variance or a standard deviation of angles of departure AODs, a variance or a standard deviation of angles of arrival AOAs, a variance or a standard deviation of tag time differences of arrival TTDOAs, a variance or a standard deviation of tag angle differences of departure TADODs, and a variance or a standard deviation of tag angle differences of arrival TADOAs. For descriptions of the tag time difference of arrival TTDOA, the tag angle difference of departure TADOD, and the tag angle difference of arrival TADOA, refer to the foregoing descriptions. Details are not described herein. Based on this possible implementation, the network side device can accurately determine the positioning information of the terminal device.

According to a second aspect, this application provides a method for determining positioning information. The method includes: A network side device receives at least one piece of relative position information sent by a terminal device, where the relative position information is information about a relative position between any two of a plurality of tags supported by the terminal device. The network side device sends a reference signal to the terminal device. The network side device receives reference signal measurement information that corresponds to the plurality of tags and that is sent by the terminal device. The network side device determines positioning information of the terminal device based on the at least one piece of relative position information and the reference signal measurement information corresponding to the plurality of tags, where the positioning information includes location information of the plurality of tags and/or orientation or posture information of the terminal device.

In a possible implementation, before the network side device receives the at least one piece of relative position information of the terminal device, the network side device may further receive first information sent by the terminal device, where the first information includes positioning capability information of the terminal device, and the positioning capability information is used to indicate whether the terminal device has a capability of determining the positioning information by using the plurality of tags. When the terminal device has the capability of determining the positioning information by using the plurality of tags, the network side device further sends indication information to the terminal device, where the indication information is used to indicate the terminal device to report the at least one piece of relative position information and/or the reference signal measurement information.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device.

In a possible implementation, the plurality of tags supported by the terminal device include one or more reference tags, the relative position information is information about a relative position between a non-reference tag and the reference tag, and the non-reference tag is a tag in the plurality of tags other than the reference tag.

In a possible implementation, the reference signal measurement information includes one or more of reference signal received power RSRP information, a time of arrival TOA, an angle of departure AOD, an angle of arrival AOA, a tag time difference of arrival TTDOA, a tag angle difference of departure TADOD, and a tag angle difference of arrival TADOA, where the tag time difference of arrival TTDOA is a difference between times of arrival TOAs of any two of the plurality of tags, the tag angle difference of departure TADOD is a difference between angles of departure AODs of any two of the plurality of tags, and the tag angle difference of arrival TADOA is a difference between angles of arrival AOAs of any two of the plurality of tags.

Optionally, the tag time difference of arrival TTDOA is specifically a difference between times of arrival TOAs of the non-reference tag and the reference tag in the plurality of tags, the tag angle difference of departure TADOD is specifically a difference between angles of departure AODs of the non-reference tag and the reference tag in the plurality of tags, and the tag angle difference of arrival TADOA is specifically a difference between angles of arrival AOAs of the non-reference tag and the reference tag in the plurality of tags.

In a possible implementation, if the reference signal measurement information includes the reference signal received power RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions.

In a possible implementation, the reference signal measurement information further includes third information, and the third information includes one or more of the following information: a variance or a standard deviation of times of arrival TOAs, a variance or a standard deviation of angles of departure AODs, a variance or a standard deviation of angles of arrival AOAs, a variance or a standard deviation of tag time differences of arrival TTDOAs, a variance or a standard deviation of tag angle differences of departure TADODs, and a variance or a standard deviation of tag angle differences of arrival TADOAs. For descriptions of the tag time difference of arrival TTDOA, the tag angle difference of departure TADOD, and the tag angle difference of arrival TADOA, refer to the foregoing descriptions. Details are not described herein.

For beneficial effects of the second aspect, refer to beneficial effects of the first aspect. Details are not described herein.

According to a third aspect, this application provides a method for determining positioning information. The method includes: A terminal device sends at least one piece of relative position information to a network side device, where the relative position information is information about a relative position between any two of a plurality of tags supported by the terminal device. The terminal device sends reference signals to the network side device by using the plurality of tags.

According to the method described in the third aspect, the terminal device may send the at least one piece of relative position information to the network side device, and send the reference signals to the network side device by using the plurality of tags, so that the network side device may determine positioning information of the terminal device based on the at least one piece of relative position information and reference signal measurement information corresponding to the plurality of tags. In this way, precision of the determined positioning information of the terminal device can be improved, so that positioning precision of the terminal device is improved. In addition, according to the method described in the third aspect, the positioning information of the terminal device may be determined based on uplink reference signals received by an access network device. This helps reduce a requirement on an environment deployment condition for positioning, orientation determining, or posture determining of the terminal device.

In a possible implementation, before the terminal device sends the at least one piece of relative position information to the network side device, the terminal device may further send first information to the network side device, where the first information includes positioning capability information of the terminal device, and the positioning capability information is used to indicate whether the terminal device has a capability of determining positioning information by using the plurality of tags. When the terminal device has the capability of determining the positioning information by using the plurality of tags, the terminal device receives indication information sent by the network side device, where the indication information is used to indicate the terminal device to report the at least one piece of relative position information. Based on this possible implementation, the network side device can determine whether the terminal device has the capability of determining the positioning information by using the plurality of tags, to help the network side device select a method for determining the positioning information of the terminal device.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device. Based on this possible implementation, the network side device can determine a capability of positioning, orientation determining, or posture determining performed by the terminal device by using the plurality of tags.

In a possible implementation, the plurality of tags supported by the terminal device include one or more reference tags, the relative position information is information about a relative position between a non-reference tag and the reference tag, and the non-reference tag is a tag in the plurality of tags other than the reference tag. Based on this possible implementation, the network side device can accurately determine the positioning information of the terminal device.

In a possible implementation, the plurality of tags supported by the terminal device include a first tag, the first tag includes a plurality of ports, and before the terminal device sends the reference signals to the network side device by using the plurality of tags, the terminal device may further send a correspondence between the plurality of tags and ports to the network side device. The terminal device may further receive configuration information sent by the network side device, where the configuration information is used to configure reference signal resources for the ports of the plurality of tags, and a same reference signal resource is configured for at least two ports of the first tag. A specific implementation in which the terminal device sends the reference signals to the network side device by using the plurality of tags is as follows: The terminal device sends the corresponding reference signals to the network side device on the corresponding reference signal resources through the ports of the plurality of tags. Based on this possible implementation, a same reference signal resource is configured for at least two ports of a same tag, to help save reference signal resources.

According to a fourth aspect, this application provides a method for determining positioning information. The method includes: A network side device receives at least one piece of relative position information sent by a terminal device, where the relative position information is information about a relative position between any two of a plurality of tags supported by the terminal device. The network side device measures reference signals sent by using the plurality of tags supported by the terminal device, to obtain reference signal measurement information corresponding to the plurality of tags. The network side device determines positioning information of the terminal device based on the at least one piece of relative position information and the reference signal measurement information corresponding to the plurality of tags, where the positioning information includes location information of the plurality of tags and/or orientation or posture information of the terminal device.

In a possible implementation, before the network side device receives the at least one piece of relative position information of the terminal device, the network side device may further receive first information sent by the terminal device, where the first information includes positioning capability information of the terminal device, and the positioning capability information is used to indicate whether the terminal device has a capability of determining the positioning information by using the plurality of tags. When the terminal device has the capability of determining the positioning information by using the plurality of tags, the network side device may further send indication information to the terminal device, where the indication information is used to indicate the terminal device to report the at least one piece of relative position information.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device.

In a possible implementation, the plurality of tags supported by the terminal device include one or more reference tags, the relative position information is information about a relative position between a non-reference tag and the reference tag, and the non-reference tag is a tag in the plurality of tags other than the reference tag.

In a possible implementation, the plurality of tags supported by the terminal device include a first tag, the first tag includes a plurality of ports, and before the network side device measures the reference signals sent by using the plurality of tags supported by the terminal device, the network side device may further receive a correspondence that is between the plurality of tags and ports and that is sent by the terminal device. The network side device sends configuration information to the terminal device, where the configuration information is used to configure reference signal resources for the ports of the plurality of tags, and a same reference signal resource is configured for at least two ports of the first tag.

In a possible implementation, the reference signal measurement information includes one or more of reference signal received power RSRP information, a time of arrival TOA, an angle of departure AOD, an angle of arrival AOA, a tag time difference of arrival TTDOA, a tag angle difference of departure TADOD, and a tag angle difference of arrival TADOA, where the tag time difference of arrival TTDOA is a difference between times of arrival TOAs of two of the plurality of tags, the tag angle difference of departure TADOD is a difference between angles of departure AODs of two of the plurality of tags, and the tag angle difference of arrival TADOA is a difference between angles of arrival AOAs of two of the plurality of tags.

Optionally, the tag time difference of arrival TTDOA is specifically a difference between times of arrival TOAs of the non-reference tag and the reference tag in the plurality of tags, the tag angle difference of departure TADOD is specifically a difference between angles of departure AODs of the non-reference tag and the reference tag in the plurality of tags, and the tag angle difference of arrival TADOA is specifically a difference between angles of arrival AOAs of the non-reference tag and the reference tag in the plurality of tags.

In a possible implementation, if the reference signal measurement information includes the reference signal received power RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions.

In a possible implementation, the reference signal measurement information further includes third information, and the third information includes one or more of the following information: a variance or a standard deviation of times of arrival TOAs, a variance or a standard deviation of angles of departure AODs, a variance or a standard deviation of angles of arrival AOAs, a variance or a standard deviation of tag time differences of arrival TTDOAs, a variance or a standard deviation of tag angle differences of departure TADODs, and a variance or a standard deviation of tag angle differences of arrival TADOAs. For descriptions of the tag time difference of arrival TTDOA, the tag angle difference of departure TADOD, and the tag angle difference of arrival TADOA, refer to the foregoing descriptions. Details are not described herein. Based on this possible implementation, the network side device can accurately determine the positioning information of the terminal device.

For beneficial effects of the fourth aspect, refer to beneficial effects of the third aspect. Details are not described herein.

According to a fifth aspect, a communication apparatus is provided. The apparatus may be a terminal device, may be an apparatus in the terminal device, or may be an apparatus that can be used together with the terminal device. The communication apparatus may alternatively be a chip system. The communication apparatus may perform the method according to the first aspect or the third aspect. A function of the communication apparatus may be implemented by hardware, or may be implemented by hardware by executing corresponding software. The hardware or the software includes one or more units corresponding to the foregoing function. The unit may be software and/or hardware. For operations performed by the communication apparatus and beneficial effects thereof, refer to the method in the first aspect or the third aspect, and beneficial effects thereof. Repeated content is not described again.

According to a sixth aspect, a communication apparatus is provided. The apparatus may be a network side device, may be an apparatus in the network side device, or may be an apparatus that can be used together with the network side device. The communication apparatus may alternatively be a chip system. The communication apparatus may perform the method according to the second aspect or the fourth aspect. A function of the communication apparatus may be implemented by hardware, or may be implemented by hardware by executing corresponding software. The hardware or the software includes one or more units corresponding to the foregoing function. The unit may be software and/or hardware. For operations performed by the communication apparatus and beneficial effects thereof, refer to the method in the second aspect or the fourth aspect, and beneficial effects thereof. Repeated content is not described again.

According to a seventh aspect, this application provides a communication apparatus. The communication apparatus includes a processor. When the processor invokes a computer program in a memory, the method performed by the terminal device in the method according to the first aspect or the third aspect is performed.

According to an eighth aspect, this application provides a communication apparatus. The communication apparatus includes a processor. When the processor invokes a computer program that is in a memory, the method performed by the network side device in the method according to the second aspect or the fourth aspect is performed.

According to a ninth aspect, this application provides a communication apparatus. The communication apparatus includes a processor and a memory. The memory is configured to store computer-executable instructions, and the processor is configured to execute the computer-executable instructions stored in the memory, so that the communication apparatus performs the method performed by the terminal device in the method according to the first aspect or the third aspect.

According to a tenth aspect, this application provides a communication apparatus. The communication apparatus includes a processor and a memory. The memory is configured to store computer-executable instructions, and the processor is configured to execute the computer-executable instructions stored in the memory, so that the communication apparatus performs the method performed by the network side device in the method according to the second aspect or the fourth aspect.

According to an eleventh aspect, this application provides a communication apparatus. The communication apparatus includes a processor, a memory, and a transceiver. The transceiver is configured to receive a signal or send a signal, the memory is configured to store program code, and the processor is configured to invoke the program code from the memory to perform the method performed by the terminal device in the method according to the first aspect or the third aspect.

According to a twelfth aspect, this application provides a communication apparatus. The communication apparatus includes a processor, a memory, and a transceiver. The transceiver is configured to receive a signal or send a signal, the memory is configured to store program code, and the processor is configured to invoke the program code from the memory to perform the method performed by the network side device in the method according to the second aspect or the fourth aspect.

According to a thirteenth aspect, this application provides a communication apparatus. The communication apparatus includes a processor and an interface circuit, the interface circuit is configured to receive code instructions and transmit the code instructions to the processor, and the processor runs the code instructions to perform the method performed by the terminal device in the method according to the first aspect or the third aspect.

According to a fourteenth aspect, this application provides a communication apparatus. The communication apparatus includes a processor and an interface circuit, the interface circuit is configured to receive code instructions and transmit the code instructions to the processor, and the processor runs the code instructions to perform the method performed by the network side device in the method according to the second aspect or the fourth aspect.

According to a fifteenth aspect, this application provides a computer-readable storage medium. The computer-readable storage medium is configured to store instructions. When the instructions are executed, the method performed by the terminal device in the method according to the first aspect or the third aspect is implemented.

According to a sixteenth aspect, this application provides a computer-readable storage medium. The computer-readable storage medium is configured to store instructions. When the instructions are executed, the method performed by the network side device in the method according to the second aspect or the fourth aspect is implemented.

According to a seventeenth aspect, this application provides a computer program product including instructions. When the instructions are executed, the method performed by the terminal device in the method according to the first aspect or the third aspect is implemented.

According to an eighteenth aspect, this application provides a computer program product including instructions. When the instructions are executed, the method performed by the network side device in the method according to the second aspect or the fourth aspect is implemented.

According to a nineteenth aspect, this application provides a communication system. The communication system includes the communication apparatus according to the fifth aspect, the seventh aspect, the ninth aspect, the eleventh aspect, or the thirteenth aspect, and the communication apparatus according to the sixth aspect, the eighth aspect, the tenth aspect, the twelfth aspect, or the fourteenth aspect.

DETAILED DESCRIPTION OF ILLUSTRATIVE EMBODIMENTS

To make objectives, technical solutions, and advantages of this application clearer, the following describes this application in detail with reference to the accompanying drawings.

To better understand the solutions provided in this application, the following first describes related terms in this application.

A reference signal (RS) is a pilot signal, and is a known signal that is sent by a transmit end to a receive end and that is used for channel estimation or channel sounding. Reference signals may be classified into an uplink reference signal and a downlink reference signal. For example, a reference signal sent by a terminal device to an access network device (for example, a base station) on a network side is an uplink reference signal, and a reference signal sent by the access network device to the terminal device is a downlink reference signal.

An antenna port is a logical concept. There is no absolute correspondence between an antenna port and a physical antenna. A correspondence between an antenna port and a physical antenna depends on implementation of a device. One transmit antenna port may correspond to one or more physical transmit antennas, and a signal receive end only needs to distinguish between different antenna ports, and does not need to distinguish between physical antennas corresponding to one antenna port. In positioning, an equivalent spatial location of an antenna port is also determined by implementation of the device. For example, spatial coordinates (or center-of-mass coordinates) of one antenna port including a plurality of physical antennas may be average coordinates of the plurality of physical antennas.

A tag supported by a terminal device may be one or a group of antenna ports in the terminal device, one or a group of receiving sensors in the terminal device, one or a group of sending sensors in the terminal device, one or a group of transceiver sensors in the terminal device, one or a group of receive antennas in the terminal device, one or a group of transmit antennas in the terminal device, one or one group of transceiver antennas in the terminal device, or one or one group of transmit/receive branches (transmit/receive branches) in the terminal device.

Figure 1:
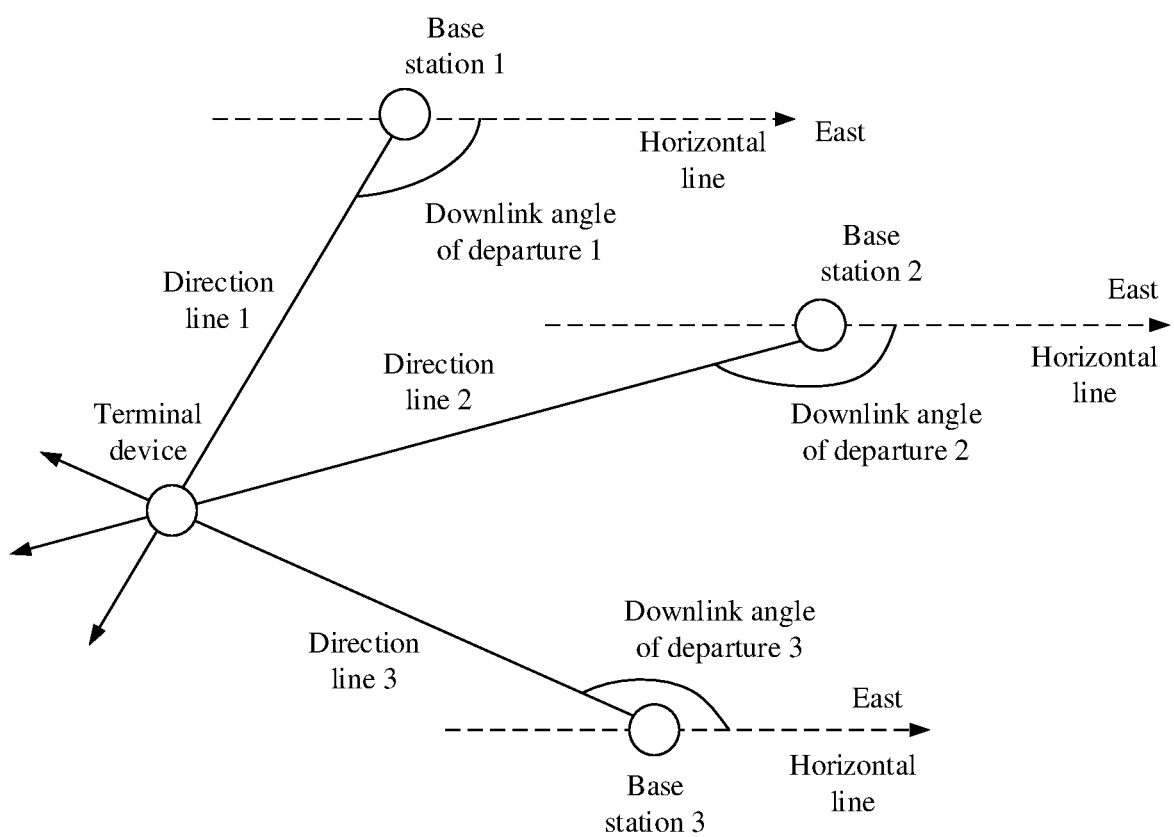
FIG. 1 is a schematic diagram of existing downlink positioning.
Figure 2:
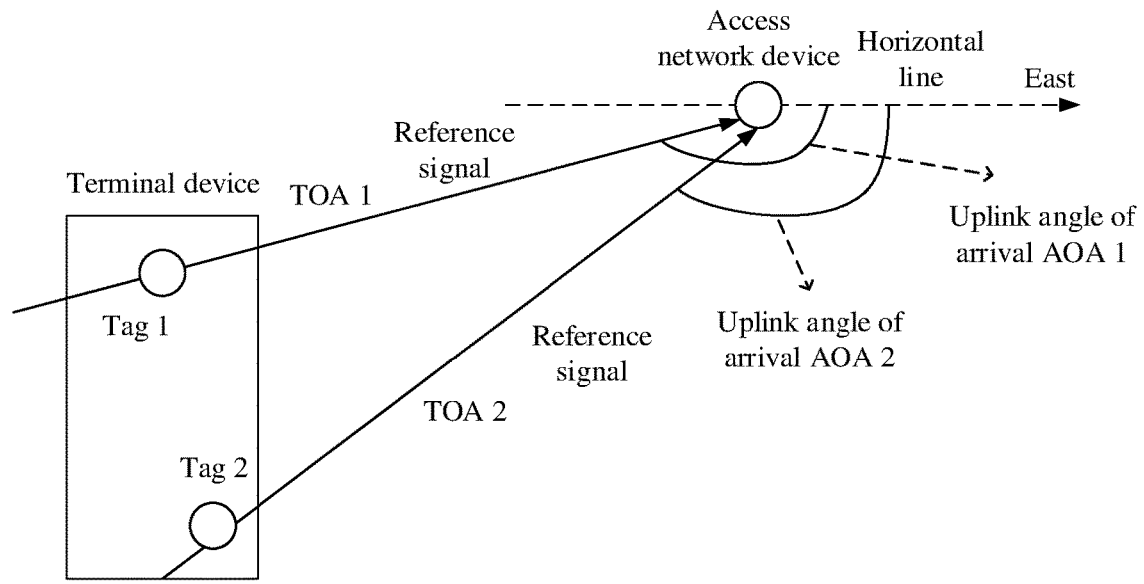
FIG. 2 is a schematic diagram of an uplink angle of arrival according to an embodiment of this application.

An uplink angle of arrival (AOA) corresponding to a tag is an included angle between a direction (for example, a direction of a horizontal plane or a normal direction of the horizontal plane) and a direction in which a reference signal sent by using the tag of a terminal device arrives at an access network device. For example, as shown in FIG. 2, an uplink angle of arrival corresponding to a tag 1 of the terminal device is an included angle AOA 1 between a due east direction of the horizontal plane and a direction in which a reference signal sent by using the tag 1 of the terminal device arrives at the access network device. An uplink angle of arrival corresponding to a tag 2 of the terminal device is an included angle AOA 2 between the due east direction of the horizontal plane and a direction in which a reference signal sent by using the tag 2 of the terminal device arrives at the access network device.

An uplink tag angle difference of arrival (TADOA) is a difference between uplink angles of arrival corresponding to any two tags. For example, as shown in FIG. 2, a difference between the uplink angle of arrival AOA 2 corresponding to the tag 2 and the uplink angle of arrival AOA 1 corresponding to the tag 1 is the uplink TADOA.

Figure 3:
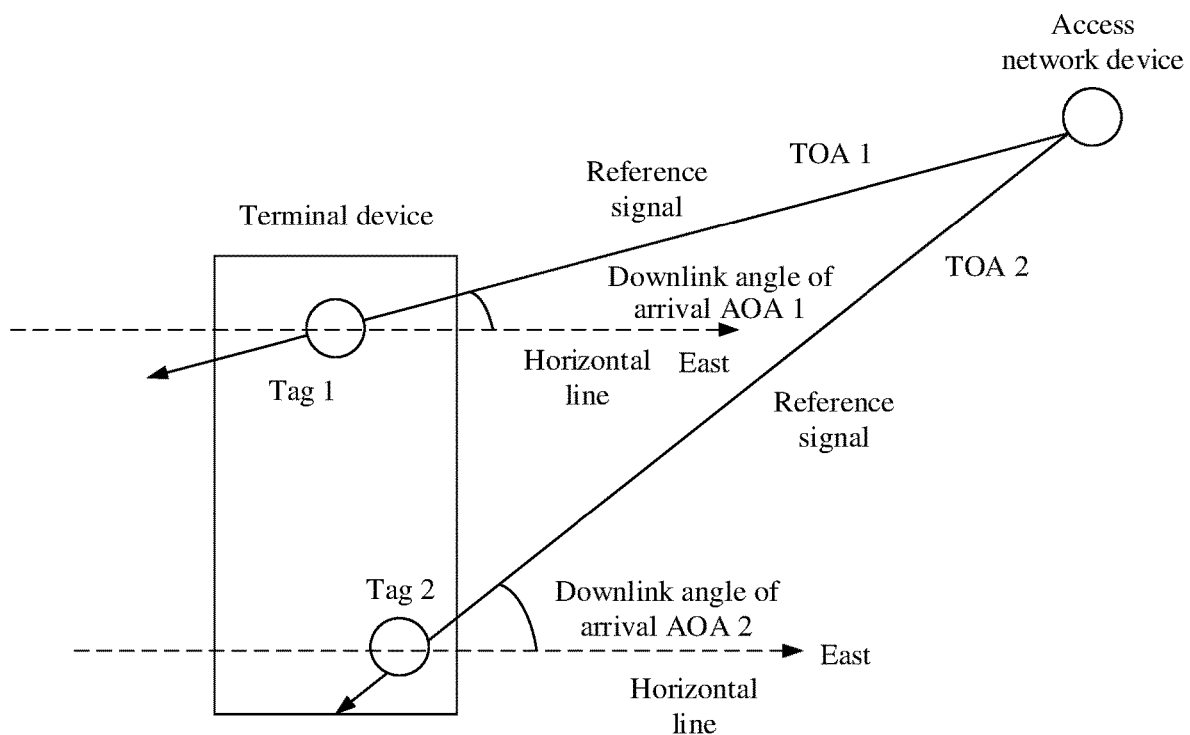
FIG. 3 is a schematic diagram of a downlink angle of arrival according to an embodiment of this application.

A downlink angle of arrival corresponding to a tag is an included angle between a direction (for example, a direction of a horizontal plane or a normal direction of the horizontal plane) and a direction in which a reference signal sent by an access network device arrives at the tag of a terminal device. For example, as shown in FIG. 3, a downlink angle of arrival corresponding to a tag 1 of the terminal device is an included angle AOA 1 between a due east direction of the horizontal plane and a direction in which a reference signal sent by the access network device arrives at the tag 1 of the terminal device. A downlink angle of arrival corresponding to a tag 2 of the terminal device is an included angle AOA 2 between the due east direction of the horizontal plane and a direction in which a reference signal sent by the access network device arrives at the tag 2 of the terminal device.

A downlink tag angle difference of arrival is a difference between downlink angles of arrival corresponding to any two tags. For example, as shown in FIG. 3, a difference between the downlink angle of arrival AOA 2 corresponding to the tag 2 and the downlink angle of arrival AOA 1 corresponding to the tag 1 is the downlink TADOA.

Figure 4:
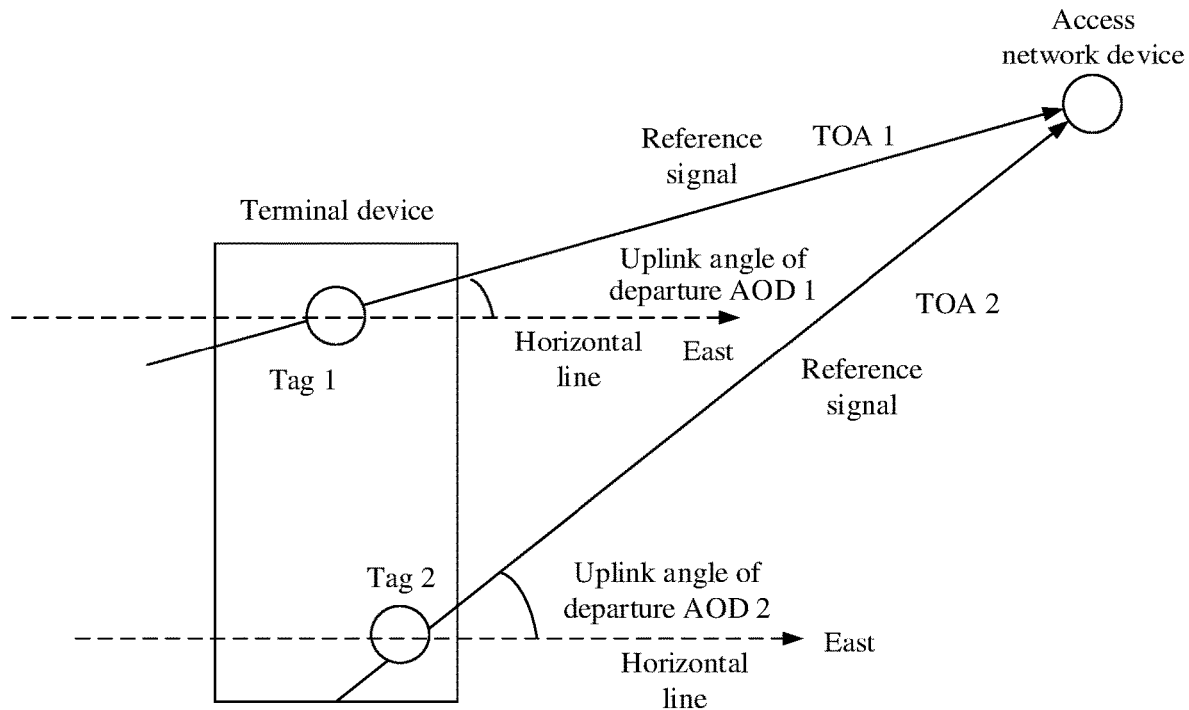
FIG. 4 is a schematic diagram of an uplink angle of departure according to an embodiment of this application.

An uplink angle of departure (AOD) corresponding to a tag is an included angle between a direction (for example, a direction of a horizontal plane or a normal direction of the horizontal plane) and a direction in which a reference signal sent by using the tag of a terminal device leaves the terminal device. For example, as shown in FIG. 4, an uplink angle of departure corresponding to a tag 1 of the terminal device is an included angle AOD 1 between a due east direction of the horizontal plane and a direction in which a reference signal sent by using the tag 1 of the terminal device leaves the terminal device. An uplink angle of departure corresponding to a tag 2 of the terminal device is an included angle AOD 2 between the due east direction of the horizontal plane and a direction in which a reference signal sent by using the tag 2 of the terminal device leaves the terminal device.

An uplink tag angle difference of departure (TADOD) is a difference between uplink angles of departure corresponding to any two tags. For example, as shown in FIG. 4, a difference between the uplink angle of departure AOD 2 corresponding to the tag 2 and the uplink angle of departure AOD 1 corresponding to the tag 1 is the uplink TADOA.

Figure 5:
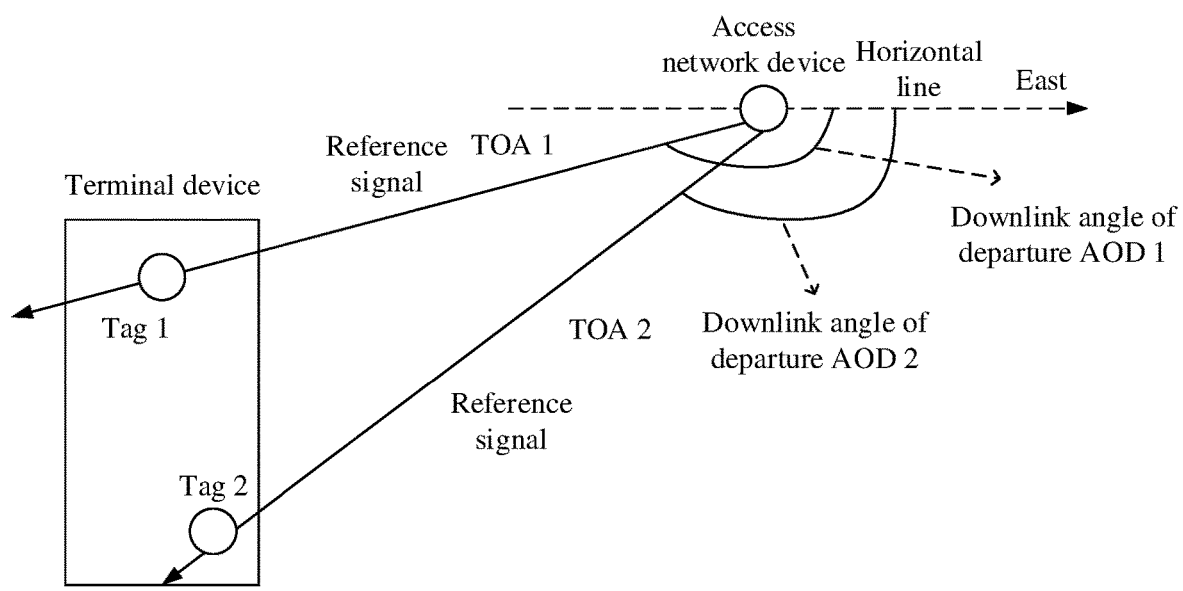
FIG. 5 is a schematic diagram of a downlink angle of departure according to an embodiment of this application.

A downlink angle of departure corresponding to a tag is an included angle between a direction (for example, a direction of a horizontal plane or a normal direction of the horizontal plane) and a direction in which a reference signal sent by an access network device to the tag of a terminal device leaves the access network device. For example, as shown in FIG. 5, a downlink angle of departure corresponding to a tag 1 of the terminal device is an included angle AOD 1 between a due east direction of the horizontal plane and a direction in which a reference signal sent by the access network device to the tag 1 of the terminal device leaves the access network device. A downlink angle of departure corresponding to a tag 2 of the terminal device is an included angle AOD 2 between the due east direction of the horizontal plane and a direction in which a reference signal sent by the access network device to the tag 2 of the terminal device leaves the access network device.

A downlink tag angle difference of departure is a difference between downlink angles of departure corresponding to any two tags. For example, as shown in FIG. 5, a difference between the downlink angle of departure AOD 2 corresponding to the tag 2 and the downlink angle of departure AOD 1 corresponding to the tag 1 is the downlink TADOA.

For an uplink time of arrival (TOA) corresponding to a tag, as shown in FIG. 2 and FIG. 4, an uplink time of arrival TOA 1 corresponding to the tag 1 is a transmission time period at which the reference signal is sent from the tag 1 to the access network device, and an uplink time of arrival TOA 2 corresponding to the tag 2 is a transmission time period at which the reference signal is sent from the tag 2 to the access network device.

An uplink tag time difference of arrival (TTDOA) is a difference between uplink times of arrival corresponding to any two tags. For example, as shown in FIG. 2 and FIG. 4, a difference between the uplink time of arrival TOA 2 corresponding to the tag 2 and the uplink time of arrival TOA 1 corresponding to the tag 1 is the uplink TTDOA.

For a downlink time of arrival corresponding to a tag, as shown in FIG. 3 and FIG. 5, a downlink time of arrival TOA 1 corresponding to the tag 1 is a transmission time period at which the reference signal is sent from the access network device to the tag 1, and a downlink time of arrival TOA 2 corresponding to the tag 2 is a transmission time period at which the reference signal is sent from the access network device to the tag 2.

A downlink tag time difference of arrival is a difference between downlink times of arrival corresponding to any two tags. For example, as shown in FIG. 3 and FIG. 5, a difference between the downlink time of arrival TOA 2 corresponding to the tag 2 and the downlink time of arrival TOA 1 corresponding to the tag 1 is the downlink TTDOA.

Figure 6:
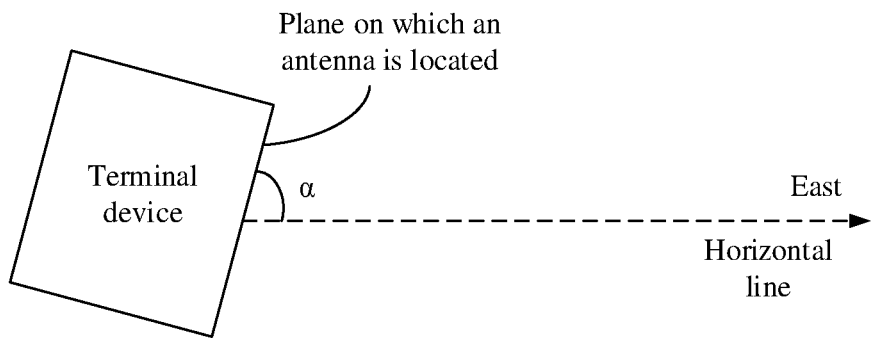
FIG. 6 is a schematic diagram of orientation information according to an embodiment of this application.

Orientation information of a terminal device: For a terminal device (such as a mobile phone or a car) with a fixed shape or a regular shape, an included angle between a plane of interest of the terminal device and a reference direction (such as a direction of a horizontal plane or a normal direction of the horizontal plane) is orientation information of the terminal device. For example, as shown in FIG. 6, the plane of interest of the terminal device is a plane on which an antenna is located. The orientation information of the terminal device is an included angle α between the plane on which the antenna of the terminal device is located and a due east direction of the horizontal plane. Alternatively, the orientation information may be other information that may indicate an orientation of the terminal device.

Figure 7:
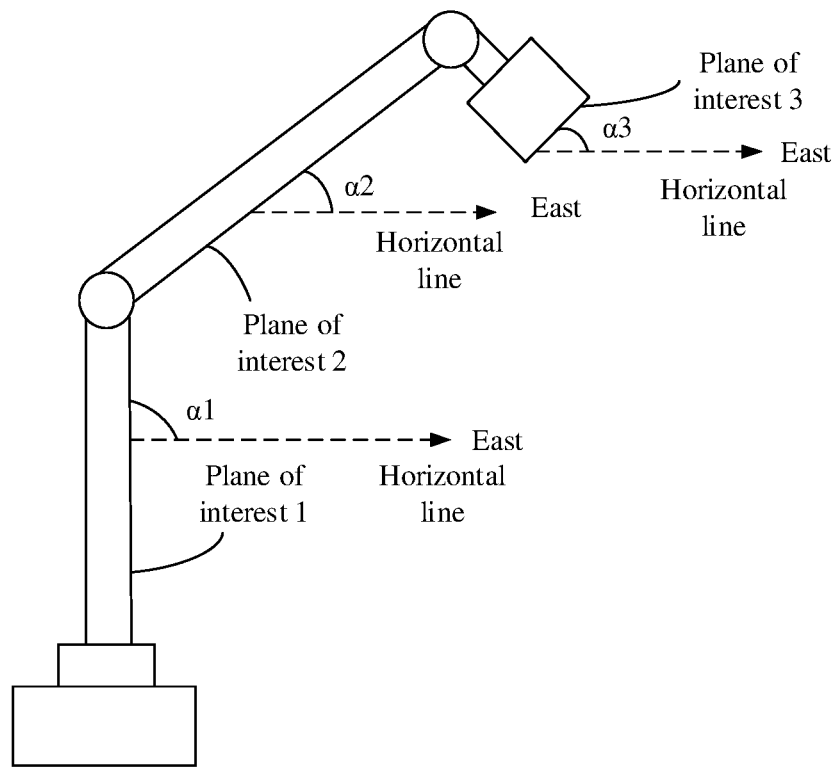
FIG. 7 is a schematic diagram of posture information according to an embodiment of this application.

For a terminal device (such as a mechanical arm) with an unfixed shape or an irregular shape, one or more included angles corresponding to one or more planes of interest of the terminal device and a reference direction are posture information of the terminal device. For example, as shown in FIG. 7, the terminal device is the mechanical arm and has three planes of interest, for example, a plane of interest 1, a plane of interest 2, and a plane of interest 3. Posture information of the mechanical arm includes an included angle $\alpha_1$ between the plane of interest 1 and a due east direction of a horizontal plane, an included angle $\alpha_2$ between the plane of interest 2 and the due east direction of the horizontal plane, and an included angle $\alpha_3$ between the plane of interest 3 and the due east direction of the horizontal plane. Alternatively, the posture information may be other information that may indicate a posture of the terminal device.

The following describes a system architecture of this application.

Figure 8:
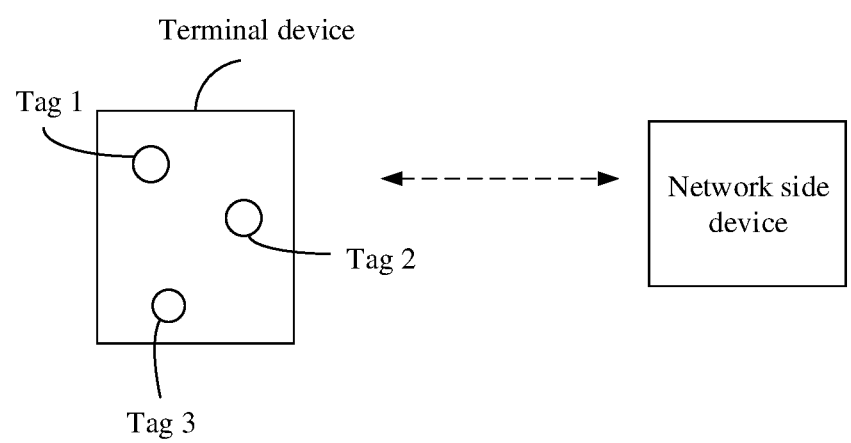
FIG. 8 is a schematic diagram of a communication system according to an embodiment of this application.

FIG. 8 is a schematic diagram of a system architecture according to an embodiment of this application. As shown in FIG. 8, the system architecture includes a terminal device and a network side device. The terminal device supports a plurality of tags. For descriptions of the tag supported by the terminal device, refer to the foregoing descriptions of the tag. Details are not described herein. For example, in FIG. 8, an example in which the terminal device supports a tag 1, a tag 2, and a tag 3 is used. The network side device may include one or more network devices.

In a possible implementation, the network side device includes one or more access network devices, and an access network device in the network side device determines positioning information of the terminal device.

For example, the network side device includes an access network device in a serving cell of the terminal device and/or an access network device in a neighboring cell of the terminal device. In a scenario in which downlink positioning information is determined, the access network device in the neighboring cell and/or the access network device in the serving cell send/sends a downlink reference signal. The terminal device measures the downlink reference signal by using a plurality of tags, to obtain downlink reference signal measurement information corresponding to the plurality of tags. The access network device in the serving cell determines the positioning information of the terminal device based on the downlink reference signal measurement information of the terminal device. In a scenario in which uplink positioning information is determined, the terminal device sends reference signals. The access network device in the neighboring cell and/or the access network device in the serving cell measure/measures the uplink reference signals, to obtain uplink reference signal measurement information. The access network device in the serving cell determines the positioning information of the terminal device based on the uplink reference signal measurement information.

In a possible implementation, the network side device includes a positioning device and one or more access network devices, and the positioning device determines positioning information of the terminal device. The positioning device may be an evolved serving mobile location center (E-SMLC), a location management function (LMF) entity, or another device that can be used to determine the positioning information of the terminal device.

For example, the network side device includes the positioning device and an access network device in a serving cell of the terminal device and/or an access network device in a neighboring cell of the terminal device. In a scenario in which downlink positioning information is determined, the access network device in the neighboring cell and/or the access network device in the serving cell send/sends a downlink reference signal. The terminal device measures the downlink reference signal by using a plurality of tags, to obtain downlink reference signal measurement information corresponding to the plurality of tags. The positioning device determines the positioning information of the terminal device based on the downlink reference signal measurement information of the terminal device. In a scenario in which uplink positioning information is determined, the terminal device sends reference signals. The access network device in the neighboring cell and/or the access network device in the serving cell measure/measures the uplink reference signals, to obtain uplink reference signal measurement information. The positioning device determines the positioning information of the terminal device based on the uplink reference signal measurement information.

In a possible implementation, the network side device includes a positioning device, one or more access network devices, and an access and mobility management function (AMF) entity. The AMF entity is a control plane network function provided by an operator network, and is responsible for access control and mobility management for accessing the operator network by the terminal device, for example, including functions such as mobility status management, temporary user identity assignment, and user authentication and authorization.

Alternatively, in addition to the positioning device, the access network device, and the AMF entity, the network side device may further include another network device. This is not limited in this embodiment of this application. Only a network device that is relatively closely related to the method for determining positioning information provided in this application is described, and another related network device is not described herein.

The terminal device in embodiments of this application is an entity that is configured to receive or transmit a signal and that is on a user side. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile console, a remote station, an access point, a remote terminal, an access terminal, a user terminal, a user agent, a user device, user equipment (UE), or the like. The terminal device may be a mobile terminal, for example, a mobile phone (or referred to as a "cellular" phone), or a computer that has a mobile terminal. For example, the terminal device may be a portable, pocket-sized, handheld, computer built-in, or vehicle-mounted mobile apparatus, which exchanges a voice and/or data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). Common terminal devices include, for example, a car, a drone, a mechanical arm, a mobile phone, a tablet computer, a notebook computer, a palmtop computer, a mobile internet device (MID), and a wearable device such as a smartwatch, a smart band, or a pedometer. However, embodiments of this application are not limited thereto.

The access network device in embodiments of this application is an entity that is configured to transmit or receive a signal and that is on a network side, and may be configured to mutually convert a received over-the-air frame and an internet protocol (internet protocol, IP) packet, and serve as a router between a terminal device and a remaining part of an access network, where the remaining part of the access network may include an IP network and the like. The access network device may further coordinate attribute management of an air interface. For example, the access network device may be an evolved NodeB (eNB or e-NodeB) in LTE, a new radio controller (NR controller), a gNodeB (gNB) in a 5G system, a centralized unit, a new radio base station, a remote radio unit, a micro base station, a relay, a distributed unit, a transmission reception point (TRP), a transmission point (TP), or any other radio access device. However, embodiments of this application are not limited thereto.

Embodiments of this application specifically provide a method for determining downlink positioning information and a method for determining uplink positioning information. The method for determining downlink positioning information means that a network side device sends a reference signal to a terminal device. The terminal device measures the reference signal. The network side device determines positioning information of the terminal device based on a reference signal measurement result of the terminal device. The method for determining uplink positioning information means that a terminal device sends reference signals to a network side device. The network side device measures the reference signals. The network side device determines positioning information of the terminal device based on reference signal measurement results.

The following further describes in detail the method for determining downlink positioning information provided in embodiments of this application.

Figure 9:
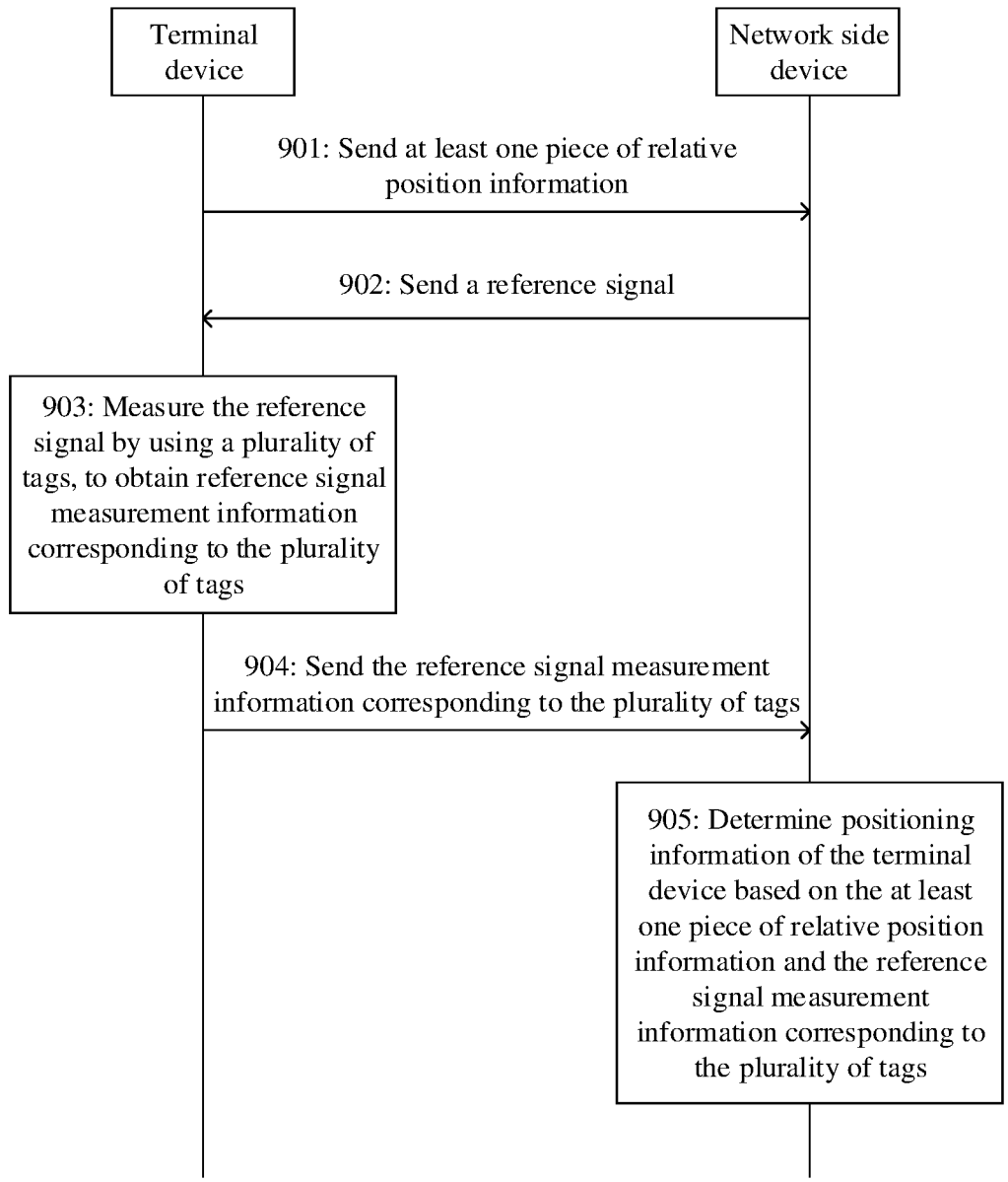
FIG. 9 is a schematic flowchart of a method for determining downlink positioning information according to an embodiment of this application.

FIG. 9 is a schematic flowchart of a method for determining downlink positioning information according to an embodiment of this application. As shown in FIG. 9, the method for determining positioning information includes the following step 901 to step 905. The method shown in FIG. 9 may be executed by a terminal device and a network side device, or may be executed by a chip in the terminal device and a chip in the network side device. In FIG. 9, an example in which the method is executed by the terminal device and the network side device is used for description. Entities for executing the method for determining positioning information shown in other accompanying drawings in embodiments of this application are similar to this, and details are not described below again.

901: The terminal device sends at least one piece of relative position information to the network side device.

The relative position information is information about a relative position between any two of a plurality of tags supported by the terminal device. For example, the relative position information may be a distance between any two tags, or the relative position information may be a height difference between any two tags, or the relative position information may be a distance and a height difference between any two tags, or the relative position information may be other location information between any two tags.

In a possible implementation, the terminal device may send the at least one piece of relative position information to the network side device at a periodicity of a preset time period. For example, the terminal device may send the at least one piece of relative position information to the network side device every one minute, one hour, or two hours. Alternatively, the terminal device may not periodically send the at least one piece of relative position information to the network side device.

The following describes two manners of determining the relative position information.

For example, the plurality of tags supported by the terminal device are three tags. As shown in the following Table 1, the terminal device sends three pieces of relative position information to the network side device. Relative location information 1 is a distance L12 between a tag 1 and a tag 2 of the terminal device. Relative location information 2 is a distance L13 between the tag 1 and a tag 3 of the terminal device. Relative location information 3 is a distance L23 between the tag 2 and the tag 3 of the terminal device. That the relative position information is the height difference between any two tags of the terminal device is similar to this. Details are not described herein.

TABLE 1

| (tag 1, tag 2) | L12 |
| (tag 1, tag 3) | L13 |
| (tag 2, tag 3) | L23 |

For another example, the plurality of tags supported by the terminal device are three tags. As shown in the following Table 2, the terminal device sends three pieces of relative position information to the network side device. Relative location information 1 is a distance L12 and a height difference H12 between a tag 1 and a tag 2 of the terminal device. Relative location information 2 is a distance L13 and a height difference H13 between the tag 1 and a tag 3 of the terminal device. Relative location information 3 is a distance L23 and a height difference H23 between the tag 2 and the tag 3 of the terminal device.

TABLE 2

| (tag 1, tag 2) | (L12, H12) |
| (tag 1, tag 3) | (L13, H13) |
| (tag 2, tag 3) | (L23, H23) |

In a possible implementation, the plurality of tags supported by the terminal device include one or more reference tags, the relative position information is information about a relative position between a non-reference tag and the reference tag, and the non-reference tag is a tag in the plurality of tags other than the reference tag.

Optionally, the reference tag may be any one of the plurality of tags supported by the terminal device. Alternatively, the reference tag may be a specific tag in the plurality of tags supported by the terminal device. For example, the information about the relative position between the reference tag and the non-reference tag is fixed or is a fixed value within a period of time. Selecting the specific tag as the reference tag helps improve precision of determined positioning information of the terminal device.

For example, the plurality of tags supported by the terminal device are three tags. A tag 1 is a reference tag, and both a tag 2 and a tag 3 are non-reference tags. As shown in the following Table 3, the terminal device sends two pieces of relative position information to the network side device. Relative location information 1 is a distance L12 between the tag 1 and the tag 2 of the terminal device. Relative location information 2 is a distance L13 between the tag 1 and the tag 3 of the terminal device. That the relative position information is a height difference between the reference tag and the non-reference tag of the terminal device is similar to this. Details are not described herein.

TABLE 3

| Tag 1 | Reference tag |
| Tag 2 | L12 |
| Tag 3 | L13 |

For another example, the plurality of tags supported by the terminal device are three tags. A tag 1 is a reference tag, and both a tag 2 and a tag 3 are non-reference tags. As shown in the following Table 4, the terminal device sends two pieces of relative position information to the network side device. Relative location information 1 is a distance L12 and a height difference H12 between the tag 1 and the tag 2 of the terminal device. Relative location information 2 is a distance L13 and a height difference H13 between the tag 1 and the tag 3 of the terminal device.

TABLE 4

| Tag 1 | Reference tag |
| Tag 2 | (L12, H12) |
| Tag 3 | (L13, H13) |

For another example, the plurality of tags supported by the terminal device are six tags. A tag 1 is a reference tag 1, and a tag 4 is a reference tag 2. A tag 2, a tag 3, a tag 5, and a tag 6 are all non-reference tags. As shown in the following Table 5, the terminal device sends four pieces of relative position information to the network side device. Relative location information 1 is a distance L12 between the tag 1 and the tag 2 of the terminal device. Relative location information 2 is a distance L13 between the tag 1 and the tag 3 of the terminal device. Relative location information 3 is a distance L45 between the tag 4 and the tag 5 of the terminal device. Relative location information 4 is a distance L46 between the tag 4 and the tag 6 of the terminal device. That the relative position information is a height difference between the reference tag and the non-reference tag of the terminal device is similar to this. Details are not described herein.

TABLE 5

| Tag 1 | Reference tag 1 |
| Tag 2 | L12 |
| Tag 3 | L13 |
| Tag 4 | Reference tag 2 |
| Tag 5 | L45 |
| Tag 6 | L46 |

For another example, the plurality of tags supported by the terminal device are six tags. A tag 1 is a reference tag 1, and a tag 4 is a reference tag 2. A tag 2, a tag 3, a tag 5, and a tag 6 are all non-reference tags. As shown in the following Table 6, the terminal device sends four pieces of relative position information to the network side device. Relative location information 1 is a distance L12 and a height difference H12 between the tag 1 and the tag 2 of the terminal device. Relative location information 2 is a distance L13 and a height difference H13 between the tag 1 and the tag 3 of the terminal device. Relative location information 3 is a distance L45 and a height difference H45 between the tag 4 and the tag 5 of the terminal device. Relative location information 4 is a distance L46 and a height difference H46 between the tag 4 and the tag 6 of the terminal device.

TABLE 6

| Tag 1 | Reference tag 1 |
| Tag 2 | (L12, H12) |
| Tag 3 | (L13, H13) |
| Tag 4 | Reference tag 2 |
| Tag 5 | (L45, H45) |
| Tag 6 | (L46, H46) |

In a possible implementation, the terminal device may further indicate, to the network side device, a tag corresponding to the relative position information. For example, the terminal device may indicate, in the following Manner 1 and Manner 2, the tag corresponding to the relative position information.

Manner 1: The terminal device implicitly indicates, based on a number of the relative position information, the tag corresponding to the relative position information.

For example, numbers of the relative position information sent by the terminal device are L12, L13, and L23 in the foregoing Table 1. The network side device determines, based on the number L12 of the relative position information 1, that the relative position information 1 corresponds to the tag 1 and the tag 2. The network side device determines, based on the number L13 of the relative position information 2, that the relative position information 2 corresponds to the tag 1 and the tag 3. The network side device determines, based on the number L23 of the relative position information 3, that the relative position information 3 corresponds to the tag 2 and the tag 3. That the terminal device sends the relative position information in Table 2 to Table 6 is similar to this. Details are not described herein.

Manner 2: The terminal device sends the relative position information to the network side device by using a matrix, to implicitly indicate, to the network side device, the tag corresponding to the relative position information.

For example, if the relative position information reported by the terminal device is the relative position information shown in the foregoing Table 1, the relative position information may be reported by using the following matrix A1. The first row of the matrix A1 corresponds to the tag 1, the second row corresponds to the tag 2, and the third row corresponds to the tag 3. The first column of the matrix A1 corresponds to the tag 1, the second column corresponds to the tag 2, and the third column corresponds to the tag 3. Because L12 is located in the first row and the second column of the matrix, the first row corresponds to the tag 1, and the second column corresponds to the tag 2, the network side device determines that the distance L12 corresponds to the tag 1 and the tag 2. Because L13 is located in the first row and the third column of the matrix, the first row corresponds to the tag 1, and the third column corresponds to the tag 3, the network side device determines that the distance L13 corresponds to the tag 1 and the tag 3. Because L23 is located in the second row and the third column of the matrix, the second row corresponds to the tag 2, and the third column corresponds to the tag 3, the network side device determines that the distance L23 corresponds to the tag 2 and the tag 3.

$$A1 = \begin{bmatrix} NA & L12 & L13 \\ NA & NA & L23 \\ NA & NA & NA \end{bmatrix}$$

For another example, if the relative position information reported by the terminal device is the relative position information shown in the foregoing Table 3, the relative position information may be reported by using the following matrix A2. A row of the matrix A2 corresponds to a reference tag, and a column of the matrix A2 corresponds to a non-reference tag. As shown in the foregoing Table 3, the terminal device has only one reference tag, and the reference tag is the tag 1. Therefore, the first row of the matrix A2 corresponds to the tag 1, and values of the second row and the third row are null (NA). The first column of the matrix A2 is null, the second column corresponds to the tag 2, and the third column corresponds to the tag 3. The network side device can determine, based on the matrix A2, that the distance L12 corresponds to the tag 1 and the tag 2, and the distance L13 corresponds to the tag 1 and the tag 3.

$$A2 = \begin{bmatrix} NA & L12 & L13 \\ NA & NA & NA \\ NA & NA & NA \end{bmatrix}$$

Alternatively, the terminal device may indicate, to the network side device in an explicit manner, the tag corresponding to the relative position information, or the terminal device may indicate, to the network side device in another manner, the relative position information corresponding to the tag. This is not limited in this embodiment of this application.

902: The network device sends a reference signal to the terminal device.

In this embodiment of this application, the network side device may periodically send the reference signal to the terminal device. Optionally, the network side device may send different reference signals to different tags of the terminal device, or the network side device may send a same reference signal to different tags of the terminal device. Optionally, the reference signal may be a channel state information reference signal (channel state information reference signal, CSI-RS) or a positioning reference signal (positioning reference signal, PRS).

903: The terminal device measures, by using the plurality of tags, the reference signal sent by the network side device, to obtain reference signal measurement information corresponding to the plurality of tags.

In this embodiment of this application, the reference signal measurement information corresponding to the plurality of tags is a plurality of pieces of measurement information obtained by measuring the reference signal by using the plurality of tags.

904: The terminal device sends, to the network side device, the reference signal measurement information corresponding to the plurality of tags.

In this embodiment of this application, after the terminal device obtains the reference signal measurement information corresponding to the plurality of tags, the terminal device sends, to the network side device, the reference signal measurement information corresponding to the plurality of tags.

In a possible implementation, the reference signal measurement information includes one or more of a reference signal received power (reference signal received power, RSRP), a TOA, an AOD, an AOA, a TTDOA, a TADOD and a TADOA. The TTDOA is a difference between TOAs of any two of the plurality of tags supported by the terminal device, the TADOD is a difference between AODs of any two of the plurality of tags supported by the terminal device, and the TADOA is a difference between AOAs of any two of the plurality of tags supported by the terminal device. The RSRP is specifically a downlink RSRP. The TOA is specifically a downlink TOA. The AOD is specifically a downlink AOD. The AOA is specifically a downlink AOA. The TTDOA is specifically a downlink TTDOA. The TADOD is specifically a downlink TADOD. The TADOA is specifically a downlink TADOA. For detailed descriptions of the downlink TOA, the downlink AOD, the downlink AOA, the downlink TTDOA, the downlink TADOD, and the downlink TADOA, refer to the foregoing term descriptions. Details are not described herein again.

In a possible implementation, the TTDOA is specifically a difference between TOAs of the reference tag and the non-reference tag in the plurality of tags supported by the terminal device, the TADOD is specifically a difference between AODs of the reference tag and the non-reference tag in the plurality of tags supported by the terminal device, and the TADOA is specifically a difference between AOAs of the reference tag and the non-reference tag in the plurality of tags supported by the terminal device.

In a possible implementation, the reference signal measurement information includes the RSRP. Alternatively, the reference signal measurement information includes the TOA. Alternatively, the reference signal measurement information includes the AOD. Alternatively, the reference signal measurement information includes the RSRP and the TOA. Alternatively, the reference signal measurement information includes the AOD and the AOA. Alternatively, the reference signal measurement information includes the TOA and the AOD. Alternatively, the reference signal measurement information includes the TOA, the AOD, and the AOA. Alternatively, the reference signal measurement information includes the TTDOA. Alternatively, the reference signal measurement information includes the TADOD. Alternatively, the reference signal measurement information includes the TADOD and the TADOA. Alternatively, the reference signal measurement information includes the TTDOA and the TADOD. Alternatively, the reference signal measurement information includes the TTDOA, the TADOD, and the TADOA. The foregoing combination manners included in the foregoing reference signal measurement information are merely examples, and another combination manner is not described herein.

For example, the plurality of tags supported by the terminal device are a tag 1 to a tag 3. The terminal device measures, by using the tag 1, the reference signal sent by the network side device, to obtain an RSRP 1. The terminal device measures, by using the tag 2, the reference signal sent by the network side device, to obtain an RSRP 2. The terminal device measures, by using the tag 3, the reference signal sent by the network side device, to obtain an RSRP 3. As shown in the following Table 7, the terminal device sends, to the network side device, the RSRP 1 to the RSRP 3 corresponding to the tag 1 to the tag 3.

TABLE 7

| Tag 1 | RSRP 1 (TOA 1 or AOD 1) |
| Tag 2 | RSRP 2 (TOA 2 or AOD 2) |
| Tag 3 | RSRP 3 (TOA 3 or AOD 3) |

Alternatively, as shown in the foregoing Table 7, the terminal device obtains the TOA 1 through measurement by using the tag 1, obtains the TOA 2 through measurement by using the tag 2, and obtains the TOA 3 through measurement by using the tag 3, and the terminal device sends the TOA 1 to the TOA 3 to the network side device.

Alternatively, as shown in the foregoing Table 7, the terminal device obtains the AOD 1 through measurement by using the tag 1, obtains the AOD 2 through measurement by using the tag 2, and obtains the AOD 3 through measurement by using the tag 3, and the terminal device sends the AOD 1 to the AOD 3 to the network side device.

Alternatively, the terminal device obtains the RSRP 1 and TOA 1 through measurement by using the tag 1, obtains the RSRP 2 and the TOA 2 through measurement by using the tag 2, and obtains the RSRP 3 and the TOA 3 through measurement by using the tag 3, and the terminal device sends the RSRP 1 to the RSRP 3 and the TOA 1 to the TOA 3 to the network side device.

Alternatively, the terminal device obtains the TOA 1 and the AOD 1 through measurement by using the tag 1, obtains the TOA 2 and the AOD 2 through measurement by using the tag 2, and obtains the TOA 3 and the AOD 3 through measurement by using the tag 3, and the terminal device sends the TOA 1 to the TOA 3 and the AOD 1 to the AOD 3 to the network side device.

Alternatively, the terminal device obtains the AOD 1 and the AOA 1 through measurement by using the tag 1, obtains the AOD 2 and the AOA 2 through measurement by using the tag 2, and obtains the AOD 3 and the AOA 3 through measurement by using the tag 3, and the terminal device sends the AOD 1 to the AOD 3 and the AOA 1 to the AOA 3 to the network side device.

Alternatively, the terminal device obtains the TOA 1, the AOD 1, and the AOA 1 through measurement by using the tag 1, obtains the TOA 2, the AOD 2, and the AOA 2 through measurement by using the tag 2, and obtains the TOA 3, the AOD 3, and the AOA 3 through measurement by using the tag 3, and the terminal device sends the TOA 1 to the TOA 3, the AOD 1 to the AOD 3, and the AOA 1 to the AOA 3 to the network side device.

For another example, the plurality of tags supported by the terminal device are a tag 1 to a tag 3. As shown in the following Table 8, the terminal device measures, by using the tag 1 to the tag 3, the reference signal sent by the network side device, to obtain a TTDOA 1 and a TTDOA 2. The TTDOA 1 is a difference between a TOA 1 measured by using the tag 1 and a TOA 2 measured by using the tag 2. The TTDOA 2 is a difference between the TOA 1 measured by using the tag 1 and a TOA 3 measured by using the tag 3. The terminal device sends the TTDOA 1 and the TTDOA 2 to the network side device.

TABLE 8

| Tag 1 and tag 2 | TTDOA 1 (and/or TADOD 1) |
| Tag 1 and tag 3 | TTDOA 2 (and/or TADOD 2) |

Alternatively, as shown in the foregoing Table 8, the terminal device measures, by using the tag 1 to the tag 3, the reference signal sent by the network side device, to obtain the TADOD 1 and the TADOD 2. The TADOD 1 is a difference between an AOD 1 measured by using the tag 1 and an AOD 2 measured by using the tag 2. The TADOD 2 is a difference between the AOD 1 measured by using the tag 1 and an AOD 3 measured by using the tag 3. As shown in the foregoing Table 8, the terminal device sends the TADOD 1 and the TADOD 2 to the network side device.

Alternatively, the terminal device measures, by using the tag 1 to the tag 3, the reference signal sent by the network side device, to obtain the TTDOA 1, the TTDOA 2, the TADOD 1, and the TADOD 2. The terminal device sends the TTDOA 1, the TTDOA 2, the TADOD 1, and the TADOD 2 to the network side device.

Alternatively, the terminal device measures, by using the tag 1 to the tag 3, the reference signal sent by the network side device, to obtain the TADOD 1, the TADOD 2, the TADOA 1, and the TADOA 2. The TADOA 1 is a difference between an AOA 1 measured by using the tag 1 and an AOA 2 measured by using the tag 2. The TADOA 2 is a difference between the AOA 1 measured by using the tag 1 and an AOA 3 measured by using the tag 3. The terminal device sends the TADOD 1, the TADOD 2, the TADOA 1, and the TADOA 2 to the network side device.

Alternatively, the terminal device measures, by using the tag 1 to the tag 3, the reference signal sent by the network side device, to obtain the TTDOA 1, the TTDOA 2, the TADOD 1, the TADOD 2, the TADOA 1, and the TADOA 2. The terminal device sends the TTDOA 1, the TTDOA 2, the TADOD 1, the TADOD 2, the TADOA 1, and the TADOA 2 to the network side device.

In a possible implementation, when a tag has a plurality of ports, an RSRP corresponding to the tag is an average value of a plurality of RSRPs measured through the plurality of ports of the tag, an RSRP corresponding to the tag is one of a plurality of RSRPs measured through the plurality of ports of the tag, or an RSRP corresponding to the tag is a plurality of RSRPs measured through the plurality of ports of the tag.

For example, the tag 1 has a port 1 and a port 2. The terminal device measures, through the port 1, the reference signal sent by the network side device, to obtain an RSRP 1. The terminal device measures, through the port 2, the reference signal sent by the network side device, to obtain an RSRP 2. In this case, an RSRP corresponding to the tag 1 is an average value of the RSRP 1 and the RSRP 2, an RSRP corresponding to the tag 1 is the RSRP 1 or the RSRP 2, or an RSRP corresponding to the tag 1 is the RSRP 1 and the RSRP 2. When a tag has a plurality of ports, a method for determining a TOA, an AOD, or an AOA corresponding to the tag is similar to this. Details are not described herein.

In a possible implementation, the reference signal measurement information further includes third information, and the third information includes one or more of the following information: a variance or a standard deviation of TOAs, a variance or a standard deviation of AODs, a variance or a standard deviation of AOAs, a variance or a standard deviation of TTDOAs, a variance or a standard deviation of TADODs, and a variance or a standard deviation of TADOAs. For specific descriptions of the TTDOA, the TADOD, and the TADOA, refer to the foregoing corresponding descriptions in step 904. Details are not described herein.

In a possible implementation, when the reference signal measurement information includes the TOA, the reference signal measurement information further includes the variance or the standard deviation of the TOAs. When the reference signal measurement information includes the AOD, the reference signal measurement information further includes the variance or the standard deviation of the AODs. When the reference signal measurement information includes the AOA, the reference signal measurement information further includes the variance or the standard deviation of the AOAs. When the reference signal measurement information includes the TTDOA, the reference signal measurement information further includes the variance or the standard deviation of the TTDOAs. When the reference signal measurement information includes the TADOD, the reference signal measurement information further includes the variance or the standard deviation of the TADODs. When the reference signal measurement information includes the TADOA, the reference signal measurement information further includes the variance or the standard deviation of the TADOAs. The foregoing combination manners included in the foregoing reference signal measurement information are merely examples, and another combination manner is not described herein.

For example, the reference signal measurement information includes the TOA. The plurality of tags supported by the terminal device are a tag 1 to a tag 3. As shown in the following Table 9, the terminal device obtains a TOA 1 corresponding to the tag 1 and a variance 1 or a standard deviation 1 of TOAs. The terminal device obtains a TOA 2 corresponding to the tag 2 and a variance 2 or a standard deviation 2 of TOAs. The terminal device obtains a TOA 3 corresponding to the tag 3 and a variance 3 or a standard deviation 3 of TOAs. The terminal device sends, to the network side device, the TOA 1 to the TOA 3 that correspond to the tag 1 to the tag 3, and the variance 1 or the standard deviation 1 of the TOAs to the variance 3 or the standard deviation 3 of the TOAs. A principle of sending the variance or the standard deviation of the AODs, the variance or the standard deviation of the AOAs, the variance or the standard deviation of the TTDOAs, the variance or the standard deviation of the TADODs, and the variance or the standard deviation of the TADOAs by the terminal device to the network side device is the same as the principle of sending the variance or the standard deviation of the TOAs. Details are not described herein.

TABLE 9

| Tag 1 | TOA 1 and variance 1 or standard deviation 1 of the TOAs |
| Tag 2 | TOA 2 and variance 2 or standard deviation 2 of the TOAs |
| Tag 3 | TOA 3 and variance 3 or standard deviation 3 of the TOAs |

The network side device determines the positioning information of the terminal device based on one or more of the variance or the standard deviation of the TOAs, the variance or the standard deviation of the AODs, the variance or the standard deviation of the AOAs, the variance or the standard deviation of the TTDOAs, the variance or the standard deviation of the TADODs, or the variance or the standard deviation of the TADOAs. This helps improve precision of the determined positioning information of the terminal device, so that positioning precision of the terminal device is improved.

905: The network side device determines the positioning information of the terminal device based on the at least one piece of relative position information and the reference signal measurement information corresponding to the plurality of tags.

In this embodiment of this application, the network side device receives the at least one piece of relative position information and the reference signal measurement information corresponding to the plurality of tags, to determine the positioning information of the terminal device. The positioning information includes location information of the plurality of tags and/or orientation or posture information of the terminal device. For example, the positioning information includes the location information of the plurality of tags. Alternatively, the positioning information includes the orientation or posture information of the terminal device. Alternatively, the positioning information includes the location information of the plurality of tags and the orientation or posture information of the terminal device. If the terminal device is a device with a fixed shape or a regular shape, the positioning information includes the location information of the plurality of tags and/or the orientation information of the terminal device. If the terminal device is a device with an unfixed shape or an irregular shape, the positioning information includes the location information of the plurality of tags and/or the posture information of the terminal device. The location information of the plurality of tags jointly represents location information of the terminal device. The location information of the plurality of tags is determined as the location information of the terminal device, instead of considering the terminal device as a particle. This helps improve accuracy of positioning the terminal device.

For example, for the terminal device (such as a mobile phone or a car) with a fixed shape or a regular shape, the orientation information of the terminal device may be an included angle between a plane of interest of the terminal device and a reference direction (for example, a direction of a horizontal plane or a normal direction of the horizontal plane). For example, as shown in FIG. 6, the plane of interest of the terminal device is a plane on which an antenna is located. The orientation information of the terminal device is an included angle $\alpha$ between the plane on which the antenna of the terminal device is located and a due east direction of the horizontal plane. Alternatively, the orientation information may be other information that may indicate an orientation of the terminal device.

For example, for the terminal device (such as a mechanical arm) with an unfixed or irregular shape, the posture information of the terminal device may be one or more included angles corresponding to one or more planes of interest of the terminal device and a reference direction. For example, as shown in FIG. 7, the terminal device is the mechanical arm and has three planes of interest, for example, a plane of interest 1, a plane of interest 2, and a plane of interest 3. Posture information of the mechanical arm includes an included angle $\alpha_1$ between the plane of interest 1 and a due east direction of a horizontal plane, an included angle $\alpha_2$ between the plane of interest 2 and the due east direction of the horizontal plane, and an included angle $\alpha_3$ between the plane of interest 3 and the due east direction of the horizontal plane. Alternatively, the posture information may be other information that may indicate a posture of the terminal device.

In a possible implementation, that the network side device determines, based on the at least one piece of relative position information and the reference signal measurement information corresponding to the plurality of tags, the location information of the plurality of tags supported by the terminal device may be specifically as follows: The network side device determines initial location information of the plurality of tags based on the reference signal measurement information corresponding to the plurality of tags, and then calibrates the initial location information of the plurality of tags based on the at least one piece of relative position information, to obtain accurate location information of the plurality of tags.

For example, a tag 1 is a reference tag. A tag 2 and a tag 3 are non-reference tags. The reference signal measurement information is the TOA. The network side device obtains initial location information a1 of the tag 1, initial location information a2 of the tag 2, and initial location information a3 of the tag 3 based on a TOA 1 corresponding to the tag 1, a TOA 2 corresponding to the tag 2, and a TOA 3 corresponding to the tag 3. The network side device calibrates the initial location information a1 to the initial location information a3 based on a distance L12 between the tag 1 and the tag 2 and a distance L13 between the tag 1 and the tag 3. Calibrated location information b1 of the tag 1, calibrated location information b2 of the tag 2, and calibrated location information b3 of the tag 3 enable a difference between a distance between the location information b1 and the location information b2 and L12 to be minimum, and enable a difference between a distance between the location information b1 and the location information b3 and L13 to be minimum. Optionally, for how the network side device determines the initial location information of the plurality of tags based on the reference signal measurement information corresponding to the plurality of tags, refer to an existing manner of determining the location information of the terminal device based on the reference signal measurement information. Details are not described herein.

Alternatively, the network side device may determine, according to another positioning method based on the at least one piece of relative position information and the reference signal measurement information corresponding to the plurality of tags, the location information of the plurality of tags supported by the terminal device. This is not limited in this embodiment of this application.

In a possible implementation, the location information of the plurality of tags may be represented by using coordinates in a Cartesian coordinate system. For example, as shown in the following Table 10, location information of a tag 1 is coordinates (X1, Y1, Z1) in the Cartesian coordinate system. Location information of a tag 2 is coordinates (X2, Y2, Z2) in the Cartesian coordinate system. Location information of a tag 3 is coordinates (X3, Y3, Z3) in the Cartesian coordinate system.

TABLE 10

| Tag 1 | (X1, Y1, Z1) |
|---|---|
| Tag 2 | (X2, Y2, Z2) |
| Tag 3 | (X3, Y3, Z3) |

In a possible implementation, the location information of the plurality of tags may be represented by using coordinates in a spherical coordinate system. For example, as shown in the following Table 11, location information of a tag 1 is spherical coordinates $(r_1, \theta_1, \psi_1)$. Location information of a tag 2 is spherical coordinates $(r_2, \theta_2, \psi_2)$. Location information of a tag 3 is spherical coordinates $(r_3, \theta_3, \psi_3)$. $r_1$ is a distance from a point determined by coordinates (X1, Y1, Z1) of the tag to an origin. $r_2$ is a distance from a point determined by coordinates (X2, Y2, Z2) of the tag to the origin. $r_3$ is a distance from a point determined by coordinates (X3, Y3, Z3) of the tag to the origin. $\theta_1$, $\theta_2$, and $\theta_3$ are elevations, and $\psi_1$, $\psi_2$, and $\psi_3$ are azimuths.

TABLE 11

| Tag 1 | $(r_1, \theta_1, \psi_1)$ |
|---|---|
| Tag 2 | $(r_2, \theta_2, \psi_2)$ |
| Tag 3 | $(r_3, \theta_3, \psi_3)$ |

In a possible implementation, the location information of the plurality of tags may be represented by using coordinates in a cylindrical coordinate system. For example, as shown in the following Table 12, location information of a tag 1 is cylindrical coordinates $(\rho_1, \psi_1, z_1)$. Location information of a tag 2 is cylindrical coordinates $(\rho_2, \psi_2, z_2)$. Location information of a tag 3 is cylindrical coordinates $(\rho_3, \psi_4, z_3)$. $\rho_1$, $\rho_2$, and $\rho_3$ are radial distances, $\psi_1$, $\psi_2$, and $\psi_3$ are azimuths, and $z_1$, $z_2$, and $z_3$ are heights.

TABLE 12

| Tag 1 | $(\rho_1, \psi_1, z_1)$ |
|---|---|
| Tag 2 | $(\rho_2, \psi_2, z_2)$ |
| Tag 3 | $(\rho_3, \psi_3, z_3)$ |

In a possible implementation, the network side device may determine the orientation information or the posture information of the terminal device according to a trigonometric function and based on the at least one piece of relative position information and the reference signal measurement information corresponding to the plurality of tags. Alternatively, the orientation information or the posture information of the terminal device may be determined in another manner based on the at least one piece of relative position information and the reference signal measurement information corresponding to the plurality of tags.

In a possible implementation, if the reference signal measurement information includes the RSRP, after receiving the RSRP, the network side device may further obtain an AOD and/or an AOA based on the RSRP, and the network side device determines the positioning information of the terminal device based on the at least one piece of relative position information and the AOD and/or the AOA.

In a possible implementation, if the reference signal measurement information includes RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions. The network side device may determine an AOD and/or an AOA based on the RSRP information and the second information. The network side device may accurately determine the AOD or the AOA based on the RSRP information and the second information.

In a possible implementation, after obtaining TOAs (and/or AODs and/or AOAs) corresponding to the plurality of tags, the network side device may obtain a TTDOA (and/or a TADOD and/or a TADOA) based on the TOAs (and/or the AODs and/or the AOAs) corresponding to the plurality of tags, and then determine the positioning information of the terminal device based on the obtained TTDOA (and/or TADOD and/or TADOA) and the at least one piece of relative position information. Alternatively, the network side device may directly use TOM (and/or AODs and/or AOAs) to determine the positioning information of the terminal device, and does not use a TTDOA (and/or a TADOD and/or a TADOA) to determine the positioning information of the terminal device.

In a possible implementation, when the network side device includes one or more access network devices, in step 901, the terminal device specifically sends the at least one piece of relative position information to an access network device of a serving cell. In step 902, specifically, the access network device of the serving cell and/or an access network device of a neighboring cell send/sends the reference signal to the terminal device. In step 904, the terminal device specifically sends, to the access network device of the serving cell, the reference signal measurement information corresponding to the plurality of tags. In step 905, specifically, the access network device of the serving cell determines the positioning information of the terminal device based on the at least one piece of relative position information and the reference signal measurement information corresponding to the plurality of tags.

In a possible implementation, when the network side device includes a positioning device and one or more access network devices, in step 901, the terminal device specifically sends the at least one piece of relative position information to the positioning device. In step 902, specifically, an access network device of a serving cell and/or an access network device of a neighboring cell send/sends the reference signal to the terminal device. In step 904, the terminal device specifically sends, to the positioning device, the reference signal measurement information corresponding to the plurality of tags. In step 905, specifically, the positioning device determines the positioning information of the terminal device based on the at least one piece of relative position information and the reference signal measurement information corresponding to the plurality of tags. Optionally, the terminal device may send the at least one piece of relative position information to the positioning device via the access network device, and send, to the positioning device via the access network device, the reference signal measurement information corresponding to the plurality of tags.

It can be learned that according to the method for determining downlink positioning information described in FIG. 9, the network side device may determine the positioning information of the terminal device based on the at least one piece of relative position information and the reference signal measurement information corresponding to the plurality of tags. This helps improve precision of the determined positioning information of the terminal device, so that positioning precision of the terminal device is improved. In addition, according to the method described in FIG. 9, the positioning information of the terminal device may be determined based on a downlink reference signal sent by an access network device. This helps reduce a requirement on an environment deployment condition for positioning, orientation determining, or posture determining of the terminal device.

The following describes in detail another method for determining downlink positioning information provided in embodiments of this application.

Figure 10:
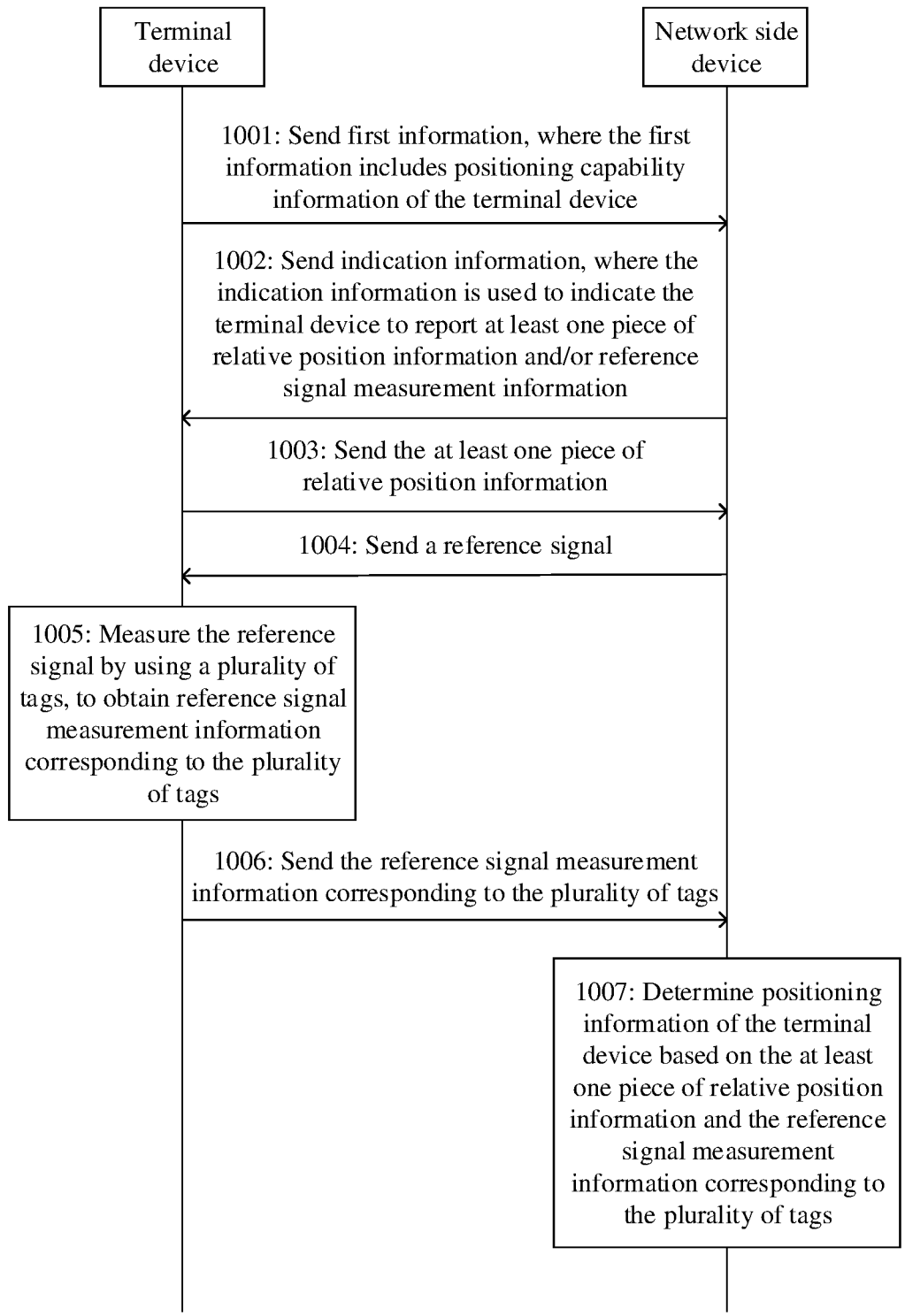
FIG. 10 is a schematic flowchart of another method for determining downlink positioning information according to an embodiment of this application.

FIG. 10 is a schematic flowchart of another method for determining downlink positioning information according to an embodiment of this application. As shown in FIG. 10, the method for determining downlink positioning information includes the following step 1001 to step 1007. Specific implementations of step 1003 to step 1007 are the same as specific implementations of step 901 to step 905, and details are not described herein. 1001: A terminal device sends first information to a network side device.

The first information includes positioning capability information of the terminal device, and the positioning capability information is used to indicate whether the terminal device has a capability of determining positioning information by using a plurality of tags. To be specific, the positioning capability information is used to indicate whether the terminal device has a capability of positioning and/or orientation determining or posture determining by using the plurality of tags.

For example, the positioning capability information may be indicated by using one bit. If a value of the bit is 1, it indicates that the terminal device has the capability of determining the positioning information by using the plurality of tags. If a value of the bit is 0, it indicates that the terminal device does not have the capability of determining the positioning information by using the plurality of tags. Alternatively, if a value of the bit is 0, it indicates that the terminal device has the capability of determining the positioning information by using the plurality of tags. If a value of the bit is 1, it indicates that the terminal device does not have the capability of determining the positioning information by using the plurality of tags. Alternatively, the positioning capability information of the terminal device may be indicated by using a plurality of bits. The foregoing indication by using one bit is merely an example. A manner of indicating the positioning capability information is not limited in this application, and another indication manner is not described herein.

1002: When the terminal device has the capability of determining the positioning information by using the plurality of tags, the network side device sends indication information to the terminal device.

In this embodiment of this application, after the network side device receives the positioning capability information, if the terminal device has the capability of determining the positioning information by using the plurality of tags, the network side device sends the indication information to the terminal device. The indication information is used to indicate the terminal device to report at least one piece of relative position information and/or reference signal measurement information. After receiving the indication information, the terminal device sends the at least one piece of relative position information to the network side device, and after obtaining the reference signal measurement information through measurement by using the plurality of tags, the terminal device sends, to the network side device, the reference signal measurement information corresponding to the plurality of tags.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device. For example, the reference signal measurement capability of the tag includes one or more of the following measurement capabilities: a TOA measurement capability, an AOD measurement capability, and an AOA measurement capability. Implementation of this possible implementation helps the network side device determine the capability of positioning, orientation determining, or posture determining performed by the terminal device by using the plurality of tags. For example, the terminal device supports three tags, only two tags both have a receiving capability and a sending capability, and both the two tags support only AOD measurement. In this case, in the method for positioning by using the plurality of tags, only a 2D location of the terminal device can be determined, and an orientation of the UE cannot be determined.

Optionally, after receiving the quantity of tags supported by the terminal device, the network side device may further determine, based on the quantity of tags supported by the terminal device, a quantity of reference signals to be configured. For example, if the terminal device supports two tags, the network side device may configure two reference signals for the terminal device.

Optionally, when the positioning capability information indicates that the terminal device has the capability of determining the positioning information by using the plurality of tags, the terminal device may send, to the network side device, one or more of the quantity of tags supported by the terminal device, the quantity of antenna ports corresponding to the plurality of tags supported by the terminal device, the reference signal measurement capabilities of the plurality of tags supported by the terminal device, the sending capabilities of the plurality of tags supported by the terminal device, or the receiving capabilities of the plurality of tags supported by the terminal device.

In a possible implementation, when the network side device includes one or more access network devices, the terminal device specifically sends the first information to the access network device. The terminal device specifically receives the indication information sent by the access network device.

In a possible implementation, when the network side device includes a positioning device and one or more access network devices, the terminal device specifically sends the first information to the positioning device. The terminal device specifically receives the indication information sent by the positioning device. The terminal device may also send the first information to the positioning device via the access network device. The positioning device may also send the indication information to the terminal device via the access network device.

The following further describes in detail a method for determining uplink positioning information provided in embodiments of this application.

Figure 11:
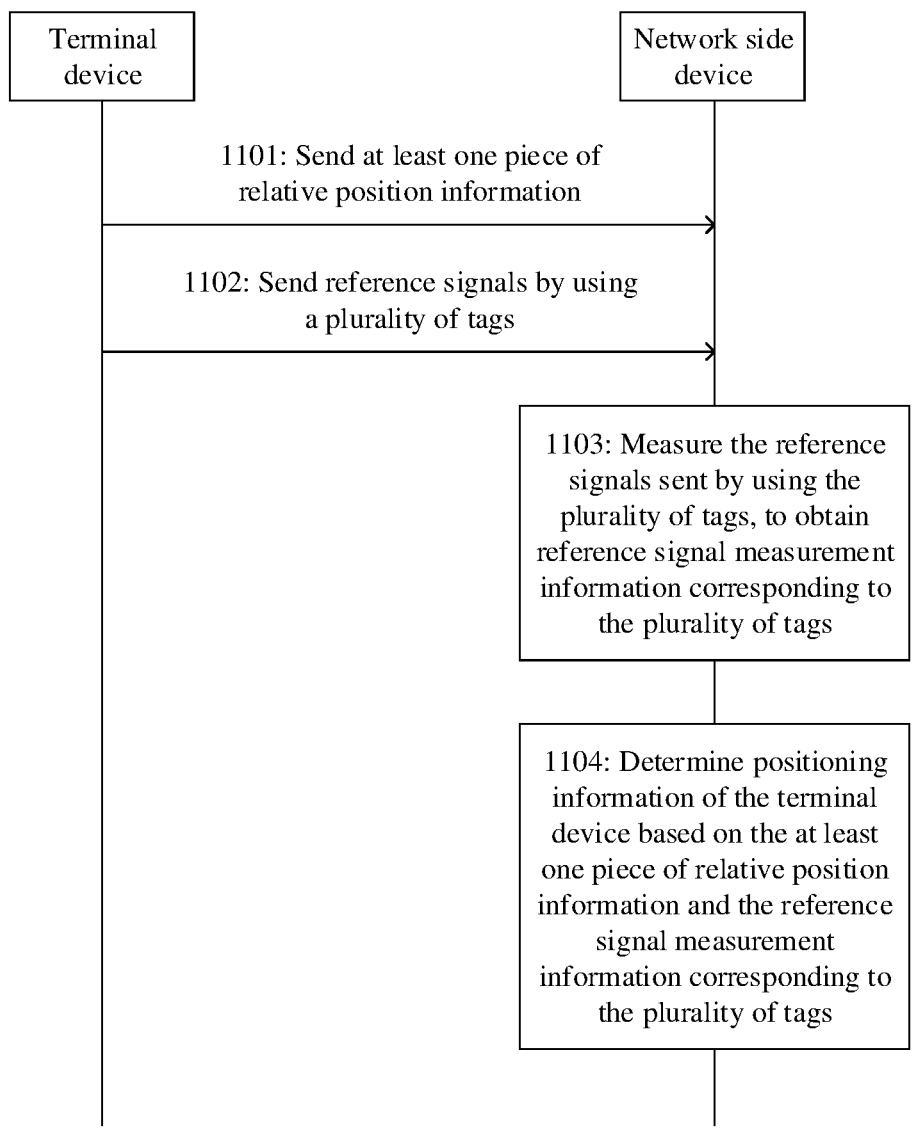
FIG. 11 is a schematic flowchart of another method for determining uplink positioning information according to an embodiment of this application.

FIG. 11 is a schematic flowchart of a method for determining uplink positioning information according to an embodiment of this application. As shown in FIG. 11, the method for determining uplink positioning information includes the following step 1101 to step 1104. 1101: A terminal device sends at least one piece of relative position information to a network side device.

A specific implementation of step 1101 is the same as that of step 901. For details, refer to the descriptions of step 901. Details are not described herein again.

1102: The terminal device sends reference signals to the network side device by using a plurality of tags.

In this embodiment of this application, the reference signals sent by the terminal device may be sounding reference signals (sounding reference signals, SRSs) or other uplink reference signals.

For example, a tag 1 to a tag 3 each include one port. As shown in the following Table 13, the tag 1 is used to send an SRS 1, the tag 2 is used to send an SRS 2, and the tag 3 is used to send an SRS 3.

TABLE 13

| Tag 1 | SRS 1 |
|-------|-------|
| Tag 2 | SRS 2 |
| Tag 3 | SRS 3 |

For another example, a tag 1 to a tag 3 each include two ports. As shown in the following Table 14, the tag 1 is used to: send an SRS 1 through a port 11, and send an SRS 2 through a port 12. The tag 2 is used to: send an SRS 3 through a port 21, and send an SRS 4 through a port 22. The tag 3 is used to: send an SRS 5 through a port 31, and send an SRS 6 through a port 32.

TABLE 14

| Tag 1 | Port 11 | SRS 1 |
|-------|---------|-------|
|       | Port 12 | SRS 2 |
| Tag 2 | Port 21 | SRS 3 |
|       | Port 22 | SRS 4 |
| Tag 3 | Port 31 | SRS 5 |
|       | Port 32 | SRS 6 |

In a possible implementation, the plurality of tags supported by the terminal device include a first tag, and the first tag has a plurality of ports. The terminal device may further send a correspondence between the plurality of tags and ports to the network side device. After the network side device receives the correspondence that is between the plurality of tags and the ports and that is sent by the terminal device, the network side device sends configuration information to the terminal device, where the configuration information is used to configure reference signal resources for the ports of the plurality of tags, and a same reference signal resource is configured for at least two ports of the first tag. After receiving the configuration information sent by the network side device, the terminal device specifically sends the corresponding reference signals to the network side device on the corresponding reference signal resources through the ports of the plurality of tags. A same reference signal resource is configured for at least two ports of a same tag, to help save reference signal resources.

For example, a same reference signal resource is configured for all ports of a same tag. The correspondence that is between the plurality of tags and the ports and that is sent by the terminal device to the network side device is shown in Table 15. After receiving the correspondence, the network side device configures a reference signal resource 1 of an SRS 1 for a port 11 and a port 12. The network side device configures a reference signal resource 2 of an SRS 2 for a port 21 and a port 22. The network side device configures a reference signal resource 3 of an SRS 3 for a port 31 and a port 32. The terminal device sends the SRS 1 on the reference signal resource 1 through the port 11 and the port 12. The terminal device sends the SRS 2 on the reference signal resource 2 through the port 21 and the port 22. The terminal device sends the SRS 3 on the reference signal resource 3 through the port 31 and the port 32.

TABLE 15

| Tag 1 | Port 11 | SRS 1 |
| --- | --- | --- |
|  | Port 12 |  |
| Tag 2 | Port 21 | SRS 2 |
|  | Port 22 |  |
| Tag 3 | Port 31 | SRS 3 |
|  | Port 32 |  |

For another example, a same reference signal resource is configured for a part of ports of a same tag. The correspondence that is between the plurality of tags and the ports and that is sent by the terminal device to the network side device is shown in Table 16. After receiving the correspondence, the network side device configures a reference signal resource 1 of an SRS 1 for a port 11 and a port 12. Because a port 21 of a tag 2 is far away from a port 22 and a port 23 that are in the tag 2, the network side device configures a reference signal resource 2 of an SRS 2 for the port 21, and the network side device configures a reference signal resource 3 of an SRS 3 for the port 22 and the port 23. The network side device configures a reference signal resource 4 of an SRS 4 for a port 31 and a port 32. The terminal device sends the SRS 1 on the reference signal resource 1 through the port 11 and the port 12. The terminal device sends the SRS 2 on the reference signal resource 2 through the port 21. The terminal device sends the SRS 3 on the reference signal resource 3 through the port 22 and the port 23. The terminal device sends the SRS 4 on the reference signal resource 4 through the port 31 and the port 32.

TABLE 16

| Tag 1 | Port 11 | SRS 1 |
| --- | --- | --- |
|  | Port 12 |  |
| Tag 2 | Port 21 | SRS 2 |
|  | Port 22 | SRS 3 |
|  | Port 23 |  |
| Tag 3 | Port 31 | SRS 4 |
|  | Port 32 |  |

1103: The network side device measures the reference signals sent by using the plurality of tags supported by the terminal device, to obtain reference signal measurement information corresponding to the plurality of tags.

The reference signal measurement information corresponding to the plurality of tags is a plurality of pieces of measurement information obtained by the network side device by measuring the reference signals sent by using the plurality of tags supported by the terminal device.

In a possible implementation, the reference signal measurement information includes one or more of reference signal received power RSRP information, a time of arrival TOA, an angle of departure AOD, an angle of arrival AOA, a tag time difference of arrival TTDOA, a tag angle difference of departure TADOD, and a tag angle difference of arrival TADOA, where the TTDOA is a difference between TOAs of any two of the plurality of tags supported by the terminal device, the TADOD is a difference between AODs of any two of the plurality of tags supported by the terminal device, and the TADOA is a difference between AOAs of any two of the plurality of tags supported by the terminal device. An RSRP is specifically an uplink RSRP. The TOA is specifically an uplink TOA. The AOD is specifically an uplink AOD. The AOA is specifically an uplink AOA. The TTDOA is specifically an uplink TTDOA. The TADOD is specifically an uplink TADOD. The TADOA is specifically an uplink TADOA. For detailed descriptions of the TOA, the AOD, the AOA, the TTDOA, the TADOD, and the TADOA, refer to the foregoing term descriptions. Details are not described herein again.

In a possible implementation, the TTDOA is specifically a difference between TOAs of a reference tag and a non-reference tag in the plurality of tags supported by the terminal device, the TADOD is specifically a difference between AODs of the reference tag and the non-reference tag in the plurality of tags supported by the terminal device, and the TADOA is specifically a difference between AOAs of the reference tag and the non-reference tag in the plurality of tags supported by the terminal device.

In a possible implementation, if the reference signal measurement information includes the RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions. The network side device may determine an AOD and/or an AOA based on the RSRP information and the second information. The network side device may accurately determine the AOD or the AOA based on the RSRP information and the second information.

In a possible implementation, after obtaining TOAs (and/or AODs and/or AOAs) corresponding to the plurality of tags, the network side device may obtain a TTDOA (and/or a TADOD and/or a TADOA) based on the TOAs (and/or the AODs and/or the AOAs) corresponding to the plurality of tags, and then determine positioning information of the terminal device based on the obtained TTDOA (and/or TADOD and/or TADOA) and the at least one piece of relative position information. Alternatively, the network side device may directly use TOM (and/or AODs and/or AOAs) to determine positioning information of the terminal device, and does not use a TTDOA (and/or a TADOD and/or a TADOA) to determine the positioning information of the terminal device.

In a possible implementation, the reference signal measurement information further includes third information, and the third information includes one or more of the following information: a variance or a standard deviation of TOAs, a variance or a standard deviation of AODs, a variance or a standard deviation of AOAs, a variance or a standard deviation of TTDOAs, a variance or a standard deviation of TADODs, and a variance or a standard deviation of TADOAs. The network side device determines the positioning information of the terminal device based on one or more of the variance or the standard deviation of the TOAs, the variance or the standard deviation of the AODs, the variance or the standard deviation of the AOAs, the variance or the standard deviation of the TTDOAs, the variance or the standard deviation of the TADODs, or the variance or the standard deviation of the TADOAs. This helps improve precision of the determined positioning information of the terminal device, so that positioning precision of the terminal device is improved.

1104: The network side device determines the positioning information of the terminal device based on the at least one piece of relative position information and the reference signal measurement information corresponding to the plurality of tags.

The positioning information includes location information of the plurality of tags and/or orientation or posture information of the terminal device. A specific implementation principle of step 1104 is the same as a specific implementation principle of step 905 in FIG. 9. Details are not described herein again.

In a possible implementation, when the network side device includes one or more access network devices, in the foregoing step 1101, the terminal device specifically sends the at least one piece of relative position information to an access network device of a serving cell. In the foregoing step 1103, specifically, the access network device of the serving cell and/or an access network device of a neighboring cell measure/measures the reference signals sent by the terminal device. In the foregoing step 1104, specifically, the access network device of the serving cell determines the positioning information of the terminal device based on the at least one piece of relative position information and the reference signal measurement information corresponding to the plurality of tags.

In a possible implementation, when the network side device includes a positioning device and one or more access network devices, in the foregoing step 1101, the terminal device specifically sends the at least one piece of relative position information to the positioning device. In the foregoing step 1103, specifically, an access network device of a serving cell and/or an access network device of a neighboring cell measure/measures the reference signals sent by the terminal device. In the foregoing step 1104, specifically, the positioning device determines the positioning information of the terminal device based on the at least one piece of relative position information and the reference signal measurement information corresponding to the plurality of tags.

It can be learned that according to the method for determining uplink positioning information described in FIG. 11, the network side device may determine the positioning information of the terminal device based on the at least one piece of relative position information and the reference signal measurement information corresponding to the plurality of tags. This helps improve precision of the determined positioning information of the terminal device, so that positioning precision of the terminal device is improved. In addition, according to the method described in FIG. 11, the positioning information of the terminal device may be determined based on uplink reference signals received by an access network device. This helps reduce a requirement on an environment deployment condition for positioning, orientation determining, or posture determining of the terminal device.

The following describes in detail another method for determining uplink positioning information provided in embodiments of this application.

Figure 12:
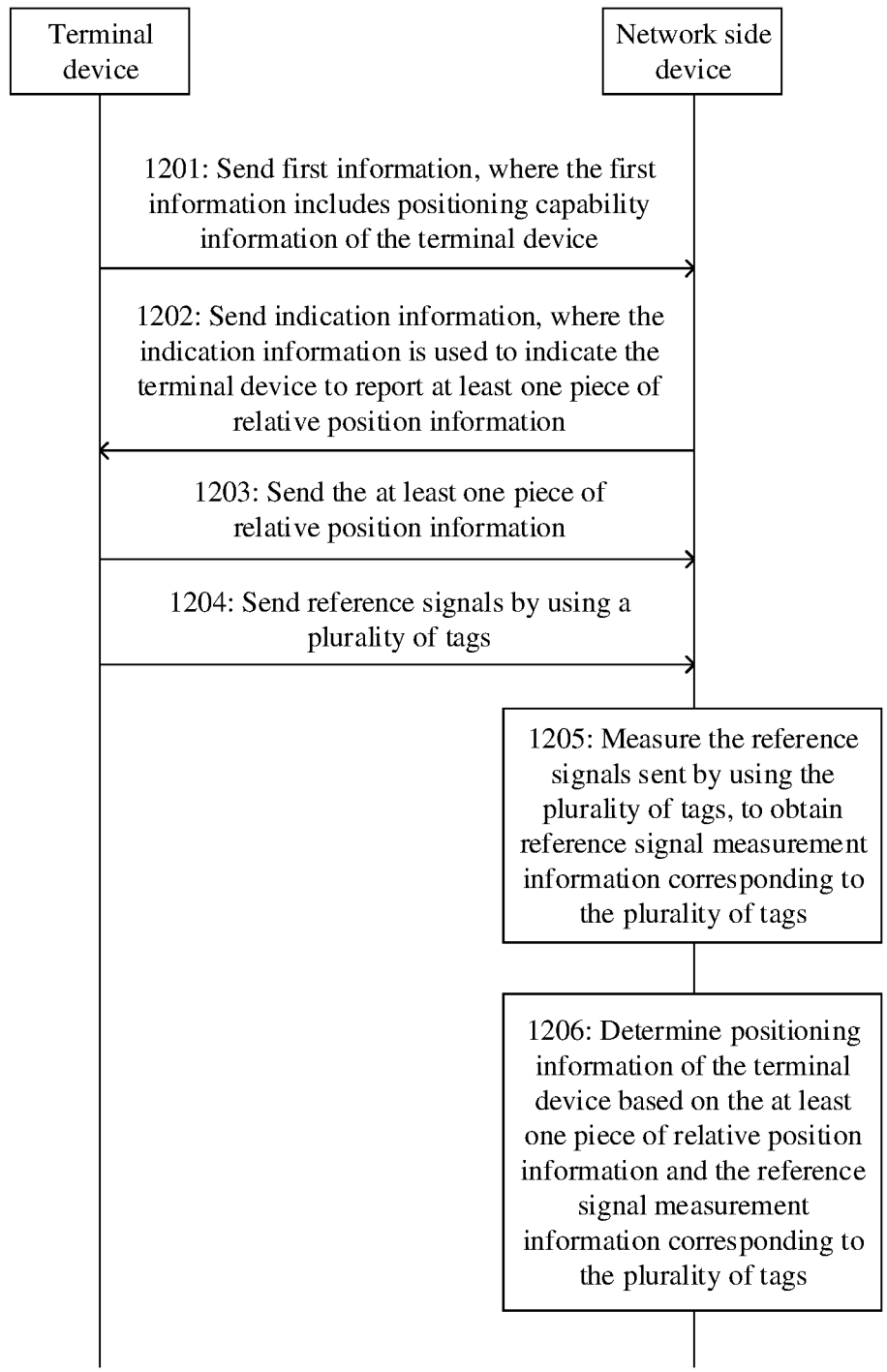
FIG. 12 is a schematic flowchart of another method for determining uplink positioning information according to an embodiment of this application.

FIG. 12 is a schematic flowchart of another method for determining uplink positioning information according to an embodiment of this application. As shown in FIG. 12, the method for determining uplink positioning information includes the following step 1201 to step 1206. Specific implementations of step 1203 to step 1206 are the same as specific implementations of step 1101 to step 1104, and details are not described herein again.

1201: A terminal device sends first information to a network side device.

The first information includes positioning capability information of the terminal device, and the positioning capability information is used to indicate whether the terminal device has a capability of determining positioning information by using a plurality of tags. To be specific, the positioning capability information is used to indicate whether the terminal device has a capability of positioning and/or orientation determining or posture determining by using the plurality of tags.

1202: When the terminal device has the capability of determining the positioning information by using the plurality of tags, the network side device sends indication information to the terminal device.

In this embodiment of this application, after the network side device receives the positioning capability information, if the terminal device has the capability of determining the positioning information by using the plurality of tags, the network side device sends the indication information to the terminal device. The indication information is used to indicate the terminal device to report at least one piece of relative position information. The terminal device sends the at least one piece of relative position information to the network side device after receiving the indication information.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device. For example, the reference signal measurement capability of the tag includes one or more of the following measurement capabilities: a TOA measurement capability, an AOD measurement capability, and an AOA measurement capability. Implementation of this possible implementation helps the network side device determine a capability of positioning, orientation determining, or posture determining performed by the terminal device by using the plurality of tags.

Optionally, after receiving the quantity of tags supported by the terminal device, the network side device may further determine, based on the quantity of tags supported by the terminal device, a quantity of reference signals to be configured.

Optionally, when the positioning capability information indicates that the terminal device has the capability of determining the positioning information by using the plurality of tags, the terminal device may send, to the network side device, one or more of the quantity of tags supported by the terminal device, the quantity of antenna ports corresponding to the plurality of tags supported by the terminal device, the reference signal measurement capabilities of the plurality of tags supported by the terminal device, the sending capabilities of the plurality of tags supported by the terminal device, or the receiving capabilities of the plurality of tags supported by the terminal device.

In a possible implementation, when the network side device includes one or more access network devices, the terminal device specifically sends the first information to the access network device. The terminal device specifically receives the indication information sent by the access network device.

In a possible implementation, when the network side device includes a positioning device and one or more access network devices, the terminal device specifically sends the first information to the positioning device. The terminal device specifically receives the indication information sent by the positioning device. Alternatively, the terminal device may also send the first information to the positioning device via the access network device. The positioning device may also send the indication information to the terminal device via the access network device.

In a possible implementation, the methods for determining positioning information described in FIG. 9 to FIG. 12 may also be applied to communication between UEs or V2X communication. For example, the network side device in FIG. 9 to FIG. 12 may be replaced with another terminal device. A port of a tag may be replaced with a sidelink port.

Figure 13:
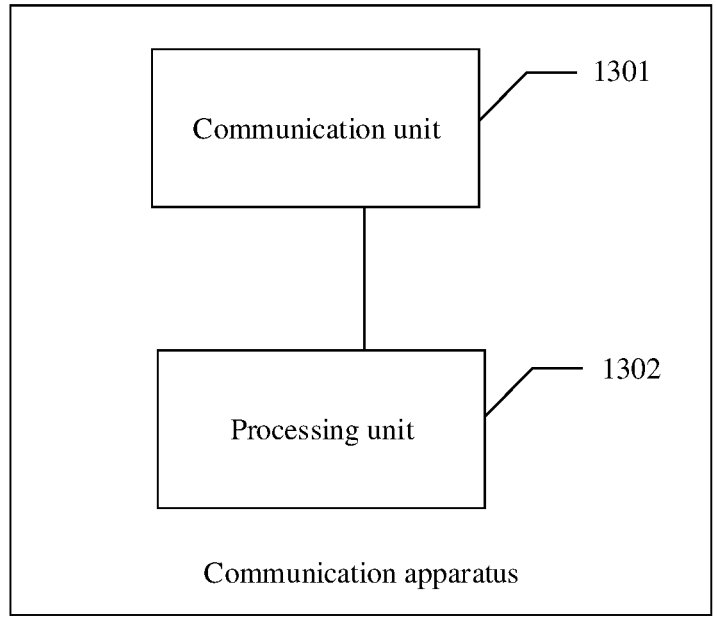
FIG. 13 is a schematic diagram of a structure of a communication apparatus according to an embodiment of this application.

FIG. 13 is a schematic diagram of a structure of a communication apparatus according to an embodiment of this application. The communication apparatus shown in FIG. 13 may be configured to implement a part of or all of functions of the terminal device in embodiments corresponding to the foregoing method for determining downlink positioning information. The communication apparatus shown in FIG. 13 may be configured to implement a part of or all of functions of the terminal device in the method embodiment described in FIG. 9 or FIG. 10. The apparatus may be a terminal device, may be an apparatus in the terminal device, or may be an apparatus that can be used together with the terminal device. The communication apparatus may alternatively be a chip system. The communication apparatus shown in FIG. 13 may include a communication unit 1301 and a processing unit 1302.

The communication unit 1301 is configured to send at least one piece of relative position information to a network side device, where the relative position information is information about a relative position between any two of a plurality of tags supported by the communication apparatus. The processing unit 1302 is configured to measure, by using the plurality of tags, a reference signal sent by the network side device, to obtain reference signal measurement information corresponding to the plurality of tags. The communication unit 1301 is further configured to send, to the network side device, the reference signal measurement information corresponding to the plurality of tags.

In a possible implementation, the communication unit 1301 is further configured to: before sending the at least one piece of relative position information to the network side device, send first information to the network side device, where the first information includes positioning capability information of the communication apparatus, the positioning capability information is used to indicate whether the communication apparatus has a capability of determining positioning information by using the plurality of tags. When the communication apparatus has the capability of determining the positioning information by using the plurality of tags, the communication unit 1301 is further configured to receive indication information sent by a network side device, where the indication information is used to indicate the communication apparatus to report the at least one piece of relative position information and/or the reference signal measurement information.

In a possible implementation, the first information further includes one or more of a quantity of tags supported by the communication apparatus, a quantity of antenna ports corresponding to the plurality of tags supported by the communication apparatus, reference signal measurement capabilities of the plurality of tags supported by the communication apparatus, sending capabilities of the plurality of tags supported by the communication apparatus, or receiving capabilities of the plurality of tags supported by the communication apparatus.

In a possible implementation, the plurality of tags supported by the communication apparatus include one or more reference tags, the relative position information is information about a relative position between a non-reference tag and the reference tag, and the non-reference tag is a tag in the plurality of tags other than the reference tag.

In a possible implementation, the reference signal measurement information includes one or more of reference signal received power RSRP information, a time of arrival TOA, an angle of departure AOD, an angle of arrival AOA, a tag time difference of arrival TTDOA, a tag angle difference of departure TADOD, and a tag angle difference of arrival TADOA, where the TTDOA is a difference between TOAs of any two of the plurality of tags, the TADOD is a difference between AODs of any two of the plurality of tags, and the TADOA is a difference between AOAs of any two of the plurality of tags.

In a possible implementation, if the reference signal measurement information includes the RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions.

In a possible implementation, the reference signal measurement information further includes third information, and the third information includes one or more of the following information: a variance or a standard deviation of TOAs, a variance or a standard deviation of AODs, a variance or a standard deviation of AOAs, a variance or a standard deviation of TTDOAs, a variance or a standard deviation of TADODs, and a variance or a standard deviation of TADOAs.

FIG. 13 is a schematic diagram of a structure of a communication apparatus according to an embodiment of this application. The communication apparatus shown in FIG. 13 may be configured to implement a part of or all of functions of the network side device in embodiments corresponding to the foregoing method for determining downlink positioning information. The communication apparatus shown in FIG. 13 may be configured to perform a part of or all of functions of the network side device in the method embodiment described in FIG. 9 or FIG. 10. The apparatus may be a network side device, where the network side device includes one or more devices; may be an apparatus in the network side device; or may be an apparatus that can be used together with the network side device. The communication apparatus may alternatively be a chip system. The communication apparatus shown in FIG. 13 may include a communication unit 1301 and a processing unit 1302.

The communication unit 1301 is configured to receive at least one piece of relative position information sent by a terminal device, where the relative position information is information about a relative position between any two of a plurality of tags supported by the terminal device. The communication unit 1301 is further configured to send a reference signal to the terminal device. The communication unit 1301 is further configured to receive reference signal measurement information that corresponds to the plurality of tags and that is sent by the terminal device. The processing unit 1302 is configured to determine positioning information of the terminal device based on the at least one piece of relative position information and the reference signal measurement information corresponding to the plurality of tags, where the positioning information includes location information of the plurality of tags and/or orientation or posture information of the terminal device.

In a possible implementation, the communication unit 1301 is further configured to: before receiving the at least one piece of relative position information of the terminal device, receive first information sent by the terminal device, where the first information includes positioning capability information of the terminal device, and the positioning capability information is used to indicate whether the terminal device has a capability of determining the positioning information by using the plurality of tags. The communication unit 1301 is further configured to: when the terminal device has the capability of determining the positioning information by using the plurality of tags, send indication information to the terminal device, where the indication information is used to indicate the terminal device to report the at least one piece of relative position information and/or the reference signal measurement information.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device.

In a possible implementation, the plurality of tags supported by the terminal device include one or more reference tags, the relative position information is information about a relative position between a non-reference tag and the reference tag, and the non-reference tag is a tag in the plurality of tags other than the reference tag.

In a possible implementation, the reference signal measurement information includes one or more of reference signal received power RSRP information, a time of arrival TOA, an angle of departure AOD, an angle of arrival AOA, a tag time difference of arrival TTDOA, a tag angle difference of departure TADOD, and a tag angle difference of arrival TADOA, where the TTDOA is a difference between TOAs of any two of the plurality of tags, the TADOD is a difference between AODs of any two of the plurality of tags, and the TADOA is a difference between AOAs of any two of the plurality of tags.

In a possible implementation, if the reference signal measurement information includes the RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions.

In a possible implementation, the reference signal measurement information further includes third information, and the third information includes one or more of the following information: a variance or a standard deviation of TOAs, a variance or a standard deviation of AODs, a variance or a standard deviation of AOAs, a variance or a standard deviation of TTDOAs, a variance or a standard deviation of TADODs, and a variance or a standard deviation of TADOAs.

Embodiments of this application further provide a communication apparatus. The communication apparatus may be configured to implement a part of or all of functions of the terminal device in embodiments corresponding to the foregoing method for determining uplink positioning information. The communication apparatus may be configured to perform a part of or all of functions of the terminal device in the method embodiment described in FIG. 11 or FIG. 12. The apparatus may be a terminal device, may be an apparatus in the terminal device, or may be an apparatus that can be used together with the terminal device. The communication apparatus may alternatively be a chip system. The communication apparatus may include a communication unit. Optionally, the communication apparatus may further include a processing unit, and the processing unit is configured to process data.

A communication unit is configured to send at least one piece of relative position information to a network side device, where the relative position information is information about a relative position between any two of a plurality of tags supported by the communication apparatus. The communication unit is further configured to send reference signals to the network side device by using the plurality of tags.

In a possible implementation, the communication unit is further configured to: before sending the at least one piece of relative position information to the network side device, send first information to the network side device, where the first information includes positioning capability information of the communication apparatus, the positioning capability information is used to indicate whether the communication apparatus has a capability of determining positioning information by using the plurality of tags. When the communication apparatus has the capability of determining the positioning information by using the plurality of tags, the communication unit is further configured to receive indication information sent by the network side device, where the indication information is used to indicate the communication apparatus to report the at least one piece of relative position information.

In a possible implementation, the first information further includes one or more of a quantity of tags supported by the communication apparatus, a quantity of antenna ports corresponding to the plurality of tags supported by the communication apparatus, reference signal measurement capabilities of the plurality of tags supported by the communication apparatus, sending capabilities of the plurality of tags supported by the communication apparatus, or receiving capabilities of the plurality of tags supported by the communication apparatus.

In a possible implementation, the plurality of tags supported by the communication apparatus include one or more reference tags, the relative position information is information about a relative position between a non-reference tag and the reference tag, and the non-reference tag is a tag in the plurality of tags other than the reference tag.

In a possible implementation, the plurality of tags supported by the communication apparatus include a first tag, the first tag includes a plurality of ports, and before sending the reference signals to the network side device by using the plurality of tags, the communication unit is further configured to send a correspondence between the plurality of tags and ports to the network side device. The communication unit is further configured to receive configuration information sent by the network side device, where the configuration information is used to configure reference signal resources for the ports of the plurality of tags, and a same reference signal resource is configured for at least two ports of the first tag. A manner in which the communication unit sends the reference signals to the network side device by using the plurality of tags is specifically as follows: sending the corresponding reference signals to the network side device on the corresponding reference signal resources through the ports of the plurality of tags.

FIG. 13 is a schematic diagram of a structure of a communication apparatus according to an embodiment of this application. The communication apparatus shown in FIG. 13 may be configured to implement a part of or all of functions of the network side device in embodiments corresponding to the foregoing method for determining uplink positioning information. The communication apparatus shown in FIG. 13 may be configured to perform a part of or all of functions of the network side device in the method embodiment described in FIG. 11 or FIG. 12. The apparatus may be a network side device, where the network side device includes one or more devices; may be an apparatus in the network side device; or may be an apparatus that can be used together with the network side device. The communication apparatus may alternatively be a chip system. The communication apparatus shown in FIG. 13 may include a communication unit 1301 and a processing unit 1302.

The communication unit 1301 is configured to receive at least one piece of relative position information sent by a terminal device, where the relative position information is information about a relative position between any two of a plurality of tags supported by the terminal device. The processing unit 1302 is configured to measure reference signals sent by using the plurality of tags supported by the terminal device, to obtain reference signal measurement information corresponding to the plurality of tags. The processing unit 1302 is further configured to determine positioning information of the terminal device based on the at least one piece of relative position information and the reference signal measurement information corresponding to the plurality of tags, where the positioning information includes location information of the plurality of tags and/or orientation or posture information of the terminal device.

In a possible implementation, the communication unit 1301 is further configured to: before receiving the at least one piece of relative position information of the terminal device, receive first information sent by the terminal device, where the first information includes positioning capability information of the terminal device, and the positioning capability information is used to indicate whether the terminal device has a capability of determining the positioning information by using the plurality of tags. The communication unit 1301 is further configured to: when the terminal device has the capability of determining the positioning information by using the plurality of tags, send indication information to the terminal device, where the indication information is used to indicate the terminal device to report the at least one piece of relative position information.

In a possible implementation, the first information further includes one or more of a quantity of tags supported by the terminal device, a quantity of antenna ports corresponding to the plurality of tags supported by the terminal device, reference signal measurement capabilities of the plurality of tags supported by the terminal device, sending capabilities of the plurality of tags supported by the terminal device, or receiving capabilities of the plurality of tags supported by the terminal device.

In a possible implementation, the plurality of tags supported by the terminal device include one or more reference tags, the relative position information is information about a relative position between a non-reference tag and the reference tag, and the non-reference tag is a tag in the plurality of tags other than the reference tag.

In a possible implementation, the plurality of tags supported by the terminal device include a first tag, and the first tag includes a plurality of ports. The communication unit 1301 is further configured to receive a correspondence that is between the plurality of tags and ports and that is sent by the terminal device. The communication unit 1301 is further configured to send configuration information to the terminal device, where the configuration information is used to configure reference signal resources for the ports of the plurality of tags, and a same reference signal resource is configured for at least two ports of the first tag.

In a possible implementation, the reference signal measurement information includes one or more of reference signal received power RSRP information, a time of arrival TOA, an angle of departure AOD, an angle of arrival AOA, a tag time difference of arrival TTDOA, a tag angle difference of departure TADOD, and a tag angle difference of arrival TADOA, where the TTDOA is a difference between TOAs of any two of the plurality of tags, the TADOD is a difference between AODs of any two of the plurality of tags, and the TADOA is a difference between AOAs of any two of the plurality of tags.

In a possible implementation, if the reference signal measurement information includes the RSRP information, the reference signal measurement information further includes second information, and the second information includes one or more of the following information: a main lobe orientation, a side lobe orientation, a main lobe width, a side lobe width, a nulling angle, and a beam gain or a beam identifier in one or more specific directions.

In a possible implementation, the reference signal measurement information further includes third information, and the third information includes one or more of the following information: a variance or a standard deviation of TOAs, a variance or a standard deviation of AODs, a variance or a standard deviation of AOAs, a variance or a standard deviation of TTDOAs, a variance or a standard deviation of TADODs, and a variance or a standard deviation of TADOAs.

Figure 14A:
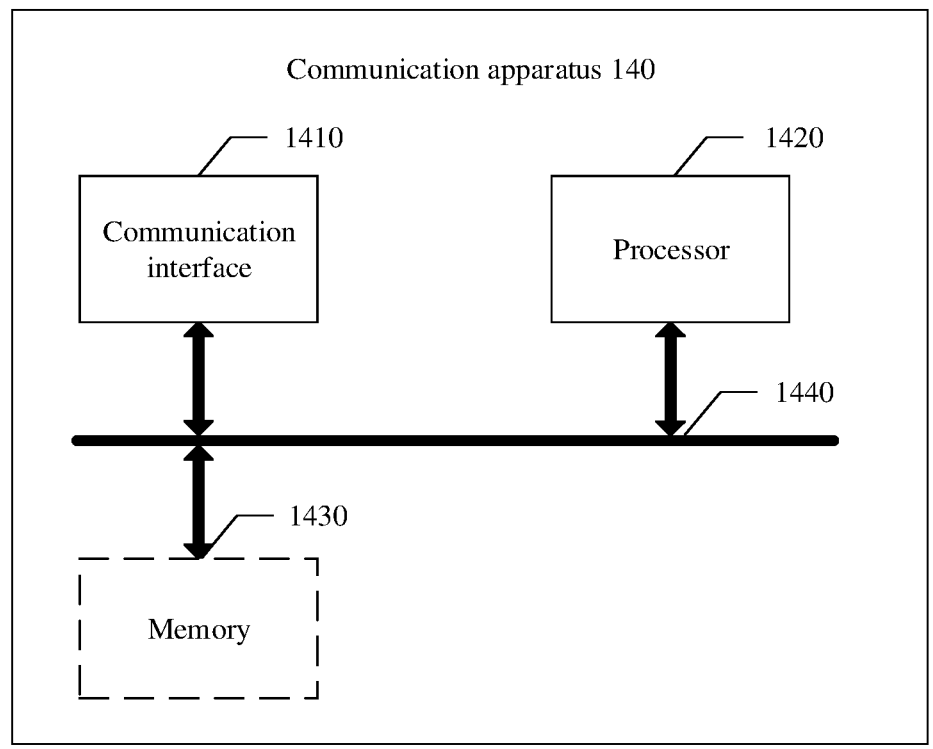
FIG. 14a is a schematic diagram of a structure of another communication apparatus according to an embodiment of this application.

FIG. 14a shows a communication apparatus 140 according to an embodiment of this application. The communication apparatus 140 is configured to implement a function of the terminal device or the network side device in the foregoing method for determining uplink positioning information or method for determining downlink positioning information. The apparatus may be a terminal device or an apparatus used in the terminal device. The apparatus used in the terminal device may be a chip system or a chip in the terminal device. Alternatively, the apparatus may be a network side device or an apparatus used in the network side device. The apparatus used in the network side device may be a chip system or a chip in the network side device. The chip system may include a chip, or may include a chip and another discrete component.

The communication apparatus 140 includes at least one processor 1420, configured to implement a data processing function of the terminal device, the positioning device, or the access network device in the method provided in embodiments of this application. The apparatus 140 may further include a communication interface 1410, configured to implement sending and receiving operations of the terminal device, the positioning device, or the access network device in the method provided in embodiments of this application. In embodiments of this application, the communication interface may be a transceiver, a circuit, a bus, a module, or a communication interface of another type, and is configured to communicate with another device via a transmission medium. For example, the communication interface 1410 is used by an apparatus in the apparatus 140 to communicate with another device. The processor 1420 receives and sends data through the communication interface 1410, and is configured to implement the methods in the foregoing method embodiments.

The apparatus 140 may further include at least one memory 1430, configured to store program instructions and/or data. The memory 1430 is coupled to the processor 1420. Coupling in embodiments of this application is indirect coupling or a communication connection between apparatuses, units, or modules, and may be in an electrical, mechanical, or another form, and is used for information exchange between the apparatuses, units, or modules. The processor 1420 may operate with the memory 1430 together. The processor 1420 may execute the program instructions stored in the memory 1430. At least one of the at least one memory may be included in the processor.

This embodiment of this application does not limit a specific connection medium between the communication interface 1410, the processor 1420, and the memory 1430. In this embodiment of this application, the memory 1430, the communication interface 1414, and the communication interface 1410 are connected through a bus 1440 in FIG. 14*a*. The bus is represented by using a bold line in FIG. 14*a*. A connection manner between other components is merely an example for description, and is not limited thereto. The bus may be classified into an address bus, a data bus, a control bus, and the like. For ease of representation, only one bold line is used to represent the bus in FIG. 14*a*, but this does not mean that there is only one bus or only one type of bus.

When the apparatus 140 is specifically an apparatus used in the terminal device, the positioning device, or the access network device, for example, when the apparatus 140 is specifically a chip or a chip system, the communication interface 1410 may output or receive a baseband signal. When the apparatus 140 is specifically the terminal device, the positioning device, or the access network device, the communication interface 1410 may output or receive a radio frequency signal. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly presented as being performed and completed by a hardware processor, or performed and completed by a combination of hardware and a software module in a processor.

Figure 14B:
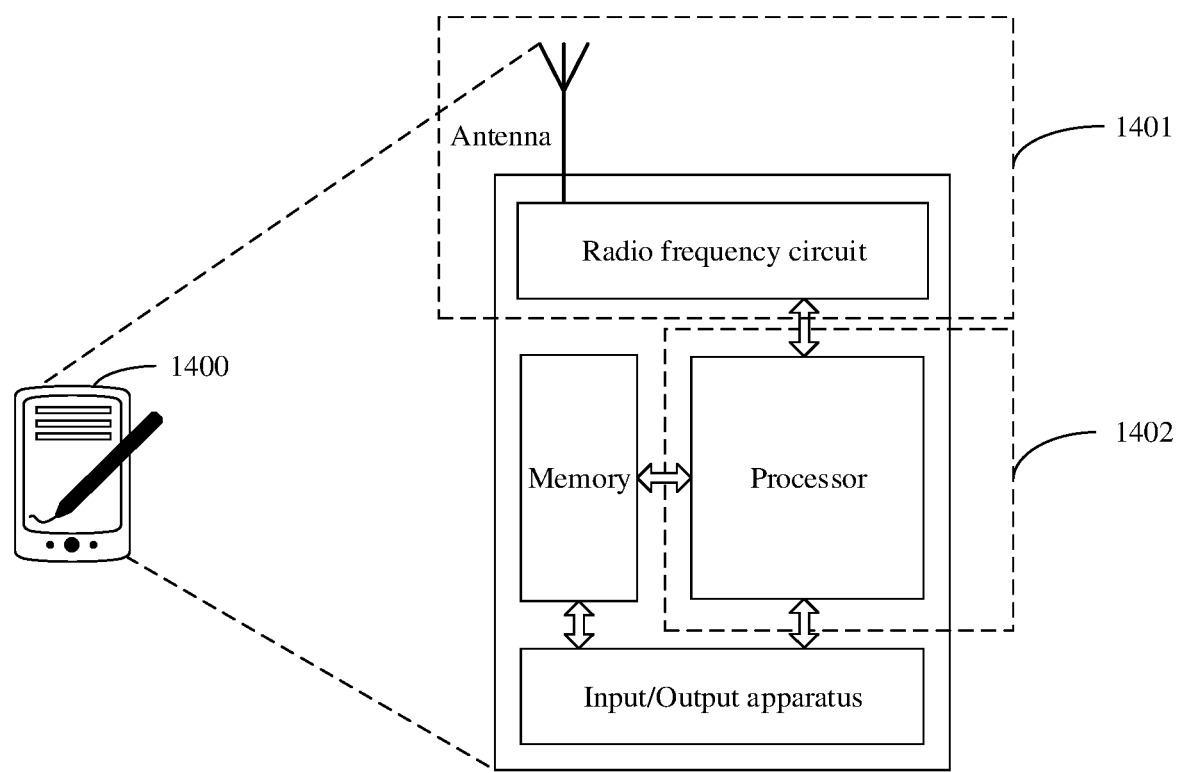
FIG. 14b is a schematic diagram of a structure of still another communication apparatus according to an embodiment of this application.

In an example, FIG. 14*b* is a schematic diagram of a structure of another terminal device 1400 according to an embodiment of this application. The terminal device may perform an operation performed by the terminal device in the method for determining uplink positioning information or the method for determining downlink positioning information.

For ease of description, FIG. 14*b* shows only main components of the terminal device. As shown in FIG. 14*b*, the terminal device 1400 includes a processor, a memory, a control circuit, an antenna, and an input/output apparatus. The processor is mainly configured to: process a communication protocol and communication data, control the entire terminal device, execute a software program, and process data of the software program, for example, configured to support the terminal device in performing the procedures described in FIG. 9 to FIG. 12. The memory is configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The terminal device 1400 may further include an input/output apparatus such as a touchscreen, a display screen, or a keyboard, and is mainly configured to receive data entered by a user and output data to the user. It should be noted that some types of terminal devices may not have the input/output apparatus.

After the terminal device is powered on, a processor may read a software program in a storage unit, explain and execute the software program, and process data of the software program. When data needs to be sent in a wireless manner, after the processor performs baseband processing on the to-be-sent data, the processor outputs a baseband signal to a radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

Persons skilled in the art may understand that, for ease of description, FIG. 14*b* shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit (central processing unit, CPU). The baseband processor is mainly configured to process a communication protocol and communication data. The CPU is mainly configured to: control the entire terminal device, execute a software program, and process data of the software program. Optionally, the processor may alternatively be a network processor (network processor, NP) or a combination of the CPU and the NP. The processor may further include a hardware chip. The foregoing hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field programmable gate array, FPGA), a generic array logic (generic array logic, GAL), or any combination thereof. The memory may include a volatile memory (volatile memory), for example, a random access memory (random access memory, RAM); or the memory may include a non-volatile memory (non-volatile memory), for example, a flash memory (flash memory), a hard disk (hard disk, HD), or a solid-state drive (solid-state drive, SSD); or the memory may include a combination of the foregoing types of memories.

For example, in this embodiment of this application, as shown in FIG. 14*b*, the antenna and the radio frequency circuit that have sending and receiving functions may be considered as a communication unit 1401 of the terminal device 1400, and the processor having a processing function may be considered as a processing unit 1402 of the terminal device 1400.

The communication unit 1401 may also be referred to as a transceiver, a transceiver machine, a transceiver apparatus, a transceiver unit, or the like, and is configured to implement the sending and receiving functions. Optionally, a component that is in the communication unit 1401 and that is configured to implement the receiving function may be considered as a receiving unit, and a component that is in the communication unit 1401 and that is configured to implement the sending function may be considered as a sending unit. That is, the communication unit 1401 includes the receiving unit and the sending unit. For example, the receiving unit may also be referred to as a receiver, a receive machine, or a receiving circuit, and the sending unit may also be referred to as a transmitter, a transmit machine, or a transmitting circuit.

In some embodiments, the communication unit 1401 and the processing unit 1402 may be integrated into one component, or may be separated as different components. In addition, the processor and the memory may be integrated into one component, or may be separated as different components.

The communication unit 1401 may be configured to perform sending and receiving operations of the terminal device in the foregoing method embodiments. The processing unit 1402 may be configured to perform a data processing operation of the terminal device in the foregoing method embodiments.

An embodiment of this application further provides a computer-readable storage medium. The computer-readable storage medium stores instructions. When the instructions are run on a processor, the method performed by the terminal device in the foregoing method embodiments is performed.

An embodiment of this application further provides a computer-readable storage medium. The computer-readable storage medium stores instructions. When the instructions are run on a processor, the method performed by the network side device in the foregoing method embodiments is performed.

An embodiment of this application further provides a computer program product. When the computer program product is run on a processor, the method performed by the terminal device in the foregoing method embodiments is performed.

An embodiment of this application further provides a computer program product. When the computer program product is run on a processor, the method performed by the network side device in the foregoing method embodiments is performed.

An embodiment of this application further provides a communication system. The communication system includes a terminal device and a network side device. The terminal device is configured to perform the method performed by the terminal device in the foregoing method embodiments. The network side device is configured to perform the method performed by the network side device in the foregoing method embodiments.

It should be noted that for brief description, the foregoing method embodiments are described as a series of actions. However, persons skilled in the art should appreciate that this application is not limited to the described order of the actions, because according to this application, some steps may be performed in another order or simultaneously. It should be further appreciated by persons skilled in the art that embodiments described in this specification all belong to preferred embodiments, and the involved actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease and brevity of description, for example, for functions and performed steps of the apparatuses and devices provided in embodiments of this application, refer to related descriptions of the method embodiments of this application. The method embodiments and the apparatus embodiments may also be referenced, combined, or cited to each other.

Finally, it should be noted that the foregoing embodiments are merely used to describe the technical solutions of this application, but are not intended to limit the technical solutions. Although this application is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the spirit and scope of the technical solutions of embodiments of this application.

What is claimed is:

1. An apparatus, comprising:
a transceiver, configured to:
send at least one piece of relative position information to a network side device, wherein each piece of relative position information is information about a relative position between any two tags of a plurality of tags supported by the apparatus, wherein the plurality of tags comprises a first tag, and the first tag comprises a plurality of ports,
receive a reference signal sent by the network side device after sending the at least one piece of relative position information; and
a processor, configured to measure, using the plurality of tags, the reference signal sent by the network side device, to obtain reference signal measurement information corresponding to the plurality of tags; and
wherein the transceiver is further configured to:
send the reference signal measurement information corresponding to the plurality of tags to the network side device.

2. The apparatus according to claim 1, wherein the transceiver is further configured to:
before sending the at least one piece of relative position information to the network side device, send first information to the network side device, wherein the first information comprises positioning capability information of the apparatus, and the positioning capability information indicates whether the apparatus has a capability of determining positioning information using the plurality of tags; and
when the apparatus has the capability of determining the positioning information by using the plurality of tags, receive indication information sent by the network side device, wherein the indication information indicates to the apparatus to report the at least one piece of relative position information or the reference signal measurement information.

3. The apparatus according to claim 2, wherein the first information further comprises one or more of a quantity of tags supported by the apparatus, a quantity of antenna ports corresponding to the plurality of tags, reference signal measurement capabilities of the plurality of tags, sending capabilities of the plurality of tags, or receiving capabilities of the plurality of tags.

4. The apparatus according to claim 1, wherein the plurality of tags comprises one or more reference tags, the at least one piece of relative position information is information about a relative position between a non-reference tag and a reference tag of the one or more reference tags, and the non-reference tag is a tag in the plurality of tags other than the one or more reference tags.

5. The apparatus according to claim 1, wherein the reference signal measurement information comprises one or more of reference signal received power (RSRP) information, a time of arrival (TOA), an angle of departure (AOD), an angle of arrival (AOA), a tag time difference of arrival (TTDOA), a tag angle difference of departure (TADOD), or a tag angle difference of arrival (TADOA); and
wherein the TTDOA is a difference between TOAs of any two tags of the plurality of tags, the TADOD is a difference between AODs of any two tags of the plurality of tags, and the TADOA is a difference between AOAs of any two tags of the plurality of tags.

6. The apparatus according to claim 5, wherein the reference signal measurement information comprises the RSRP information, the reference signal measurement information further comprises second information, and the second information comprises one or more of the following information: a main lobe orientation, a side lobe orientation, a main lobe width, a side lobe width, a nulling angle, or a beam gain or a beam identifier in one or more specific directions.

7. The apparatus according to claim 5, wherein the reference signal measurement information further comprises third information, and the third information comprises one or more of the following information:
a variance or a standard deviation of TOAs, a variance or a standard deviation of AODs, a variance or a standard deviation of AOAs, a variance or a standard deviation of TTDOAs, a variance or a standard deviation of TADODs, and a variance or a standard deviation of TADOAs.

8. The apparatus according to claim 1, wherein the reference signal measurement information is based on a plurality of measurements measured through the plurality of ports of the first tag.

9. The apparatus of claim 8, wherein the reference signal measurement information comprises an average value of a plurality of reference signal received powers (RSRPs) measured through the plurality of ports of the first tag.

10. An apparatus, comprising:
a transceiver, configured to:
receive at least one piece of relative position information sent by a terminal device, wherein each piece of relative position information is information about a relative position between any two tags of a plurality of tags supported by the terminal device, wherein the plurality of tags comprises a first tag, and the first tag comprises a plurality of ports;
send a reference signal to the terminal device after receiving the relative position information sent by the terminal device; and
receive reference signal measurement information based on the sent reference signal that corresponds to the plurality of tags and that is sent by the terminal device; and
a processor, configured to determine positioning information of the terminal device based on the at least one piece of relative position information and the reference signal measurement information corresponding to the plurality of tags, wherein the positioning information comprises location information of the plurality of tags or orientation information of the terminal device or posture information of the terminal device.

11. The apparatus according to claim 10, wherein the transceiver is further configured to:
before receiving the at least one piece of relative position information of the terminal device, receive first information sent by the terminal device, wherein the first information comprises positioning capability information of the terminal device, and the positioning capability information indicates whether the terminal device has a capability of determining the positioning information using the plurality of tags; and
when the terminal device has the capability of determining the positioning information by using the plurality of tags, send indication information to the terminal device, wherein the indication information indicates to the terminal device to report the at least one piece of relative position information or the reference signal measurement information.

12. The apparatus according to claim 11, wherein the first information further comprises one or more of a quantity of tags supported by the terminal device, a quantity of antenna ports corresponding to the plurality of tags, reference signal measurement capabilities of the plurality of tags, sending capabilities of the plurality of tags, or receiving capabilities of the plurality of tags.

13. The apparatus according to claim 11, wherein the plurality of tags comprise one or more reference tags, the at least one piece of relative position information is information about a relative position between a non-reference tag and a reference tag of the one or more reference tags, and the non-reference tag is a tag in the plurality of tags other than the one or more reference tags.

14. The apparatus according to claim 10, wherein the reference signal measurement information comprises one or more of reference signal received power (RSRP) information, a time of arrival (TOA), an angle of departure (AOD), an angle of arrival (AOA), a tag time difference of arrival (TTDOA), a tag angle difference of departure (TADOD), or a tag angle difference of arrival (TADOA); and
wherein the TTDOA is a difference between TOAs of any two tags of the plurality of tags, the TADOD is a difference between AODs of any two tags of the plurality of tags, and the TADOA is a difference between AOAs of any two tags of the plurality of tags.

15. The apparatus according to claim 10, wherein the reference signal measurement information is based on a plurality of measurements measured through the plurality of ports of the first tag.

16. An apparatus, comprising:
a transceiver, configured to:
send first information to a network side device, wherein the first information comprises positioning capability information of the apparatus, and the positioning capability information indicates whether the apparatus has a capability of determining positioning information using the plurality of tags;
when the apparatus has the capability of determining the positioning information by using the plurality of tags, receive indication information sent by the network side device, wherein the indication information indicates to the apparatus to report at least one piece of relative position information;
send the at least one piece of relative position information to the network side device after the first information is sent, wherein the at least one piece of relative position information is information about a relative position between any two tags of a plurality of tags supported by the apparatus, wherein the plurality of tags comprises a first tag, and the first tag comprises a plurality of ports;

send a correspondence between the plurality of tags and ports to the network side device; and receive configuration information sent by the network side device, wherein the configuration information is used to configure reference signal resources for ports of the plurality of tags, and a same reference signal resource is configured for at least two ports of the plurality of ports of the first tag;

send reference signals to the network side device using the plurality of tags after the correspondence between the plurality of tags and ports is sent, wherein a manner in which the transceiver sends the reference signals to the network side device by using the plurality of tags comprises:

sending the corresponding reference signals to the network side device on the corresponding reference signal resources through the ports of the plurality of tags.

17. The apparatus according to claim 16, wherein the first information further comprises one or more of a quantity of tags supported by the apparatus, a quantity of antenna ports corresponding to the plurality of tags, reference signal measurement capabilities of the plurality of tags, sending capabilities of the plurality of tags, or receiving capabilities of the plurality of tags.

18. The apparatus according to claim 16, wherein the plurality of tags comprise one or more reference tags, the at least one piece of relative position information is information about a relative position between a non-reference tag and the one or more reference tags, and the non-reference tag is a tag in the plurality of tags other than the one or more reference tags.

* * * * *